(12) United States Patent
Piedmonte

(10) Patent No.: US 8,032,509 B2
(45) Date of Patent: Oct. 4, 2011

(54) SYSTEMS AND METHODS FOR DATA STORAGE AND RETRIEVAL USING ALGEBRAIC RELATIONS COMPOSED FROM QUERY LANGUAGE STATEMENTS

(75) Inventor: Christopher M. Piedmonte, Liberty Hill, TX (US)

(73) Assignee: Algebraix Data Corporation, Austin, TX (US)

( * ) Notice: Subject to any disclaimer, the term of this patent is extended or adjusted under 35 U.S.C. 154(b) by 0 days.

(21) Appl. No.: 13/007,522

(22) Filed: Jan. 14, 2011

(65) Prior Publication Data

US 2011/0113025 A1   May 12, 2011

Related U.S. Application Data

(63) Continuation of application No. 11/383,476, filed on May 15, 2006, now Pat. No. 7,877,370.

(51) Int. Cl.
*G06F 7/00* (2006.01)
(52) U.S. Cl. ........................... 707/708; 707/713
(58) Field of Classification Search .................. 707/708, 707/713
See application file for complete search history.

(56) References Cited

U.S. PATENT DOCUMENTS

| | | | |
|---|---|---|---|
| 4,290,115 A | 9/1981 | Pitt et al. | |
| 4,925,311 A | 5/1990 | Neches et al. | |
| 4,945,471 A | 7/1990 | Neches | |
| 4,956,772 A | 9/1990 | Neches | |
| 5,006,978 A | 4/1991 | Neches | |
| 5,303,244 A | 4/1994 | Watson | |
| 5,321,813 A | 6/1994 | McMillen et al. | |
| 5,511,190 A | 4/1996 | Sharma et al. | |
| 5,588,129 A | 12/1996 | Ballard | |
| 5,625,815 A | 4/1997 | Maier et al. | |
| 5,717,911 A | 2/1998 | Madrid et al. | |
| 5,740,433 A | 4/1998 | Carr et al. | |
| 5,740,434 A | 4/1998 | Eastep | |
| 5,745,753 A | 4/1998 | Mosher, Jr. | |

(Continued)

FOREIGN PATENT DOCUMENTS

WO   WO 2007/134278 A2   11/2007

(Continued)

OTHER PUBLICATIONS

Angus, J., "Fast, Scalable Data Mart Maker," Informationweek, Feb. 8, 1999.

(Continued)

*Primary Examiner* — Mohammad Ali
*Assistant Examiner* — John P Hocker
(74) *Attorney, Agent, or Firm* — Wilson Sonsini Goodrich & Rosati

(57) ABSTRACT

Systems and methods for storing and accessing data. A query language statement may reference a plurality of data sets and a plurality of algebraic relations between the data sets may be composed from the query language statement. The algebraic relations may be used to define new data sets and to optimize access to data sets. A store of algebraic relations may be accumulated over time. Alternative collections of algebraic relations may be generated and evaluated to determine an optimized collection of algebraic relations to use in calculating and providing a requested data set. The optimization may be performed using the algebraic relations rather than retrieving underlying data sets from storage. As a result, optimization may be performed at processor speeds to minimize the amount of time required for data to be retrieved from slower storage.

19 Claims, 23 Drawing Sheets

U.S. PATENT DOCUMENTS

| | | | |
|---|---|---|---|
| 5,778,354 | A | 7/1998 | Leslie et al. |
| 5,794,252 | A | 8/1998 | Bailey et al. |
| 5,799,322 | A | 8/1998 | Mosher, Jr. |
| 5,819,255 | A | 10/1998 | Celis et al. |
| 5,822,747 | A | 10/1998 | Graefe et al. |
| 5,835,915 | A | 11/1998 | Carr et al. |
| 5,884,328 | A | 3/1999 | Mosher, Jr. |
| 5,987,453 | A | 11/1999 | Krishna et al. |
| 6,021,405 | A | 2/2000 | Celis et al. |
| 6,032,144 | A * | 2/2000 | Srivastava et al. ............... 707/1 |
| 6,061,676 | A | 5/2000 | Srivastava et al. |
| 6,076,152 | A | 6/2000 | Huppenthal et al. |
| 6,105,033 | A | 8/2000 | Levine |
| 6,161,103 | A | 12/2000 | Rauer et al. |
| 6,327,587 | B1 | 12/2001 | Forster |
| 6,449,605 | B1 | 9/2002 | Witkowski |
| 6,460,027 | B1 | 10/2002 | Cochrane et al. |
| 6,484,247 | B1 | 11/2002 | Gendron et al. |
| 6,516,310 | B2 | 2/2003 | Paulley |
| 6,529,903 | B2 | 3/2003 | Smith et al. |
| 6,601,058 | B2 | 7/2003 | Forster et al. |
| 6,615,209 | B1 | 9/2003 | Gomes et al. |
| 6,621,612 | B2 | 9/2003 | Chan et al. |
| 6,658,423 | B1 | 12/2003 | Pugh et al. |
| 6,678,681 | B1 | 1/2004 | Brin |
| 6,865,575 | B1 | 3/2005 | Smith et al. |
| 7,240,078 | B2 | 7/2007 | Cheng et al. |
| 7,254,810 | B2 | 8/2007 | Barsness et al. |
| 7,464,867 | B1 * | 12/2008 | Kolls ........................... 235/381 |
| 7,613,734 | B2 | 11/2009 | Piedmonte |
| 7,720,806 | B2 | 5/2010 | Piedmonte |
| 7,725,444 | B2 | 5/2010 | Devarakonda et al. |
| 7,730,042 | B2 | 6/2010 | Devarakonda et al. |
| 7,769,754 | B2 | 8/2010 | Piedmonte |
| 7,797,319 | B2 | 9/2010 | Piedmonte |
| 7,865,503 | B2 | 1/2011 | Piedmonte |
| 7,877,370 | B2 | 1/2011 | Piedmonte |
| 2002/0087361 | A1 * | 7/2002 | Benigno et al. ................ 705/3 |
| 2003/0105925 | A1 * | 6/2003 | Yoshimura et al. .......... 711/118 |
| 2004/0054648 | A1 * | 3/2004 | Mogi et al. ..................... 707/1 |
| 2007/0022093 | A1 | 1/2007 | Wyatt et al. |
| 2007/0266000 | A1 | 11/2007 | Piedmonte |
| 2007/0276784 | A1 | 11/2007 | Piedmonte |
| 2007/0276785 | A1 | 11/2007 | Piedmonte |
| 2007/0276786 | A1 | 11/2007 | Piedmonte |
| 2007/0276787 | A1 | 11/2007 | Piedmonte |
| 2007/0276802 | A1 | 11/2007 | Piedmonte |
| 2010/0082541 | A1 | 4/2010 | Kottomtharayil |
| 2010/0125553 | A1 | 5/2010 | Huang et al. |

FOREIGN PATENT DOCUMENTS

WO    WO 2007/134278 A3    11/2007

OTHER PUBLICATIONS

Champion, M., "The Feasibility of an Operation-Centric Environment for Processing XML Documents," Jan. 26, 2001, pp. 1-4 (printed Feb. 20, 2008 from http://xsp.xegesis.org/).

Champion, M., "The Feasibility of an Operation-Centric Environment for Processing XML Documents," Jan. 26, 2001.

Champion, M., "XSP: An Integration Technology for Systems Development and Evolution Formal Specifications for Unifying XML and Relational Systems," Jul. 12, 2001, pp. 1-19 (printed Feb. 20, 2008 from http://xsp.xegesis.org/).

Childs, D. L., "Adaptive Data Restructuring Functions," Sep. 8, 2002 (printed Feb. 20, 2008 from http://xsp.xegesis.org/).

Childs, D. L., "Axiomatic Extended Set Theory," Jun. 11, 2002 (printed Feb. 20, 2008 from http://xsp.xegesis.org/).

Childs, D. L., "Data Warehouse or Information Black Hole?" Mar. 6, 2007 (printed Feb. 20, 2008 from http://xsp.xegesis.org/).

Childs, D. L., "Extended Set Theory a General Model for Very Large, Distributed, Backend Information Systems," 3$^{rd}$ International Conference on Very Large Data Bases, Oct. 6-8, 1977, pp. 28-46, Tokyo, Japan.

Childs, D. L., "Feasibility of a Set-Theoretic Data Structure a General Structure Based on a Reconstituted Definition of Relation," Proceedings of IFIP Congress, Aug. 5-10, 1968, pp. 420-430, vol. 1, Edinburgh, Amsterdam.

Childs, D. L., "Introduction to a Mathematical Foundation for Systems Development," NATO ASI Series, Database Machines, 1986, pp. 217-255, vol. F24, Springer-Verlag Berlin Heidelberg.

Childs, D. L., "Modeling Data Processing Implementations," Apr. 3, 2006 (printed Feb. 20, 2008 from http://xsp.xegesis.org/).

Childs, D. L., "Modeling Data Processing Implementations," Jun. 8, 2002 (printed Feb. 20, 2008 from http://xsp.xegesis.org/).

Childs, D. L., "Pebble Piles & Index Structures," Aug. 8, 2005 (printed Feb. 20, 2008 from http://xsp.xegesis.org/).

Childs, D. L., "Rapid Response Transaction Processing," Mar. 3, 2005, pp. 1-2 (printed Feb. 20, 2008 from http://xsp.xegesis.org/).

Childs, D. L., "RDM-Relations & XML-Structures as Xsets," Jul. 9, 2002, pp. 1-3 (printed Feb. 20, 2008 from http://xsp.xegesis.org/).

Childs, D. L., "What is XSP?" Aug. 8, 2005 (printed Feb. 20, 2008 from http://xsp.xegesis.org/).

Childs, D. L., "XSP Technology for XML Systems Design and Development," Nov. 29, 2000, pp. 1-30.

Childs, D. L., "XSP Technology: A Foundation for Integrated Information Access Systems," Jun. 20, 2002 (printed Feb. 20, 2008 from http://xsp.xegesis.org/).

Childs, D. L., "XST Notes: Tuplesets, Tagged-Sets, Application, & Etc.", Dec. 4, 2005 (printed Feb. 20, 2008 from http://xsp.xegesis.org/).

Codd, E. F., "A Relational Model of Data for Large Shared Data Banks," Communications of the ACM, Jun. 1970, pp. 377-387, vol. 13, No. 6.

Fillat, A.I. et al, "Generalized Organization of Large Data-Bases; A Set-Theoretic Approach to Relations," Project MAC, Mass. Institute of Tech., Jun. 1970, 249 pages (thesis for B.S. and M.S., Dept. of Electrical Engineering, Mass. Institute of Tech.).

Haghighat, M. et al., "Symbolic Program Analysis and Optimization for Parallelizing Compilers," 1999, pp. 1-30.

Information Access Architectures, PowerPoint presentation 2002 (printed Feb. 20, 2008 from http://xsp.xegesis.org/).

Rapid Information Access, Jan. 11, 2003 (printed Feb. 20, 2008 from http://xsp.xegesis.org/).

Skolem, T., "Two Remarks on Set Theory," Math. Scand., Apr. 15, 1957, pp. 40-46, vol. 5.

Stein, D., "The Trouble with Software," 2003, pp. 1-10 (printed Feb. 20, 2008 from http://xsp.xegesis.org/).

Stout, R., The Information Access Accelerator, PowerPoint presentation Nov. 4, 2005 (printed Feb. 20, 2008 from http://xsp.xegesis.org/).

X-Set A Closer Look at Digital Archaeology's Patent-Pending Technology, Digital Archaeology, 1998.

X-Set Technology White Paper, Digital Archaeology, Jun. 15, 2000.

Piedmont, C., "Systems and Methods for Data Storage and Retrieval Using Algebraic Relations Composed form Query Language Statements," U.S. Appl. No. 11/383,476, filed May 15, 2006, Office Action dated Apr. 10, 2009.

Piedmont, C., "Systems and Methods for Data Storage and Retrieval Using Algebraic Relations Composed form Query Language Statements," U.S. Appl. No. 11/383,476, filed May 15, 2006, Interview Summary dated Jun. 25, 2009.

Piedmont, C., "Systems and Methods for Data Storage and Retrieval Using Algebraic Relations Composed form Query Language Statements," U.S. Appl. No. 11/383,476, filed May 15, 2006, Response to Apr. 10, 2009 Office Action dated Oct. 9, 2009.

Piedmont, C., "Systems and Methods for Data Storage and Retrieval Using Algebraic Relations Composed form Query Language Statements," U.S. Appl. No. 11/383,476, filed May 15, 2006, Final Office Action mailed Feb. 4, 2010.

Piedmont, C., "Systems and Methods for Data Storage and Retrieval Using Algebraic Relations Composed form Query Language Statements," U.S. Appl. No. 11/383,476, filed May 15, 2006, Response to Final Office Action dated Jul. 6, 2010.

Piedmonte, C., "Systems and Methods for Providing Data Sets Using a Store of Algebraic Relations," U.S. Appl. No. 11/383,477, filed May 15, 2006, Non Final Office Action dated Jun. 11, 2008.

Piedmonte, C., "Systems and Methods for Providing Data Sets Using a Store of Algebraic Relations," U.S. Appl. No. 11/383,477, filed May 15, 2006, Response to Non Final Office Action dated Dec. 10, 2008.

Piedmonte, C., "Systems and Methods for Providing Data Sets Using a Store of Algebraic Relations," U.S. Appl. No. 11/383,477, filed May 15, 2006, Final Office Action dated Mar. 5, 2009.

Piedmonte, C., "Systems and Methods for Providing Data Sets Using a Store of Algebraic Relations," U.S. Appl. No. 11/383,477, filed May 15, 2006, Response to Final Office Action dated Jun. 5, 2009.

Piedmonte, C., "Systems and Methods for Data Storage and Retrieval using Algebraic Optimization," U.S. Appl. No. 11/383,478, filed May 15, 2006, Non Final Office Action dated Apr. 1, 2008.

Piedmonte, C., "Systems and Methods for Data Storage and Retrieval using Algebraic Optimization," U.S. Appl. No. 11/383,478, filed May 15, 2006, Response to Non Final Office Action dated Oct. 1, 2008.

Piedmonte, C., "Systems and Methods for Data Storage and Retrieval using Algebraic Optimization," U.S. Appl. No. 11/383,478, filed May 15, 2006, Interview Summary, date of interview Dec. 4, 2008, Jan. 2, 2009.

Piedmonte, C., "Systems and Methods for Data Storage and Retrieval using Algebraic Optimization," U.S. Appl. No. 11/383,478, filed May 15, 2006, Final Office Action dated Jan. 15, 2009.

Piedmonte, C., "Systems and Methods for Data Storage and Retrieval using Algebraic Optimization," U.S. Appl. No. 11/383,478, filed May 15, 2006, Response to Final Office Action dated Feb. 25, 2009 (response to noncompliant response filed Jun. 4, 2009).

Piedmonte, C., "Systems and Methods for Data Storage and Retrieval using Algebraic Optimization," U.S. Appl. No. 11/383,478, filed May 15, 2006, Office Action dated Aug. 18, 2009.

Piedmonte, C., "Systems and Methods for Data Storage and Retrieval using Algebraic Optimization," U.S. Appl. No. 11/383,478, filed May 15, 2006, Response to Office Action filed Dec. 18, 2009.

Piedmonte, C., "Systems and Methods for Data Storage and Retrieval using Algebraic Optimization," U.S. Appl. No. 11/383,478, filed May 15, 2006, Interview Summary dated Dec. 3, 2009.

Piedmonte, C., "Systems and Methods for Data Manipulation Using Multiple Storage Formats," U.S. Appl. No. 11/383,479, filed May 5, 2006, Non Final Office Action dated Apr. 29, 2008.

Piedmonte, C., "Systems and Methods for Data Manipulation Using Multiple Storage Formats," U.S. Appl. No. 11/383,479, filed May 5, 2006, Response to Non Final Office Action dated Oct. 29, 2008.

Piedmonte, C., "Systems and Methods for Data Manipulation Using Multiple Storage Formats," U.S. Appl. No. 11/383,479, filed May 5, 2006, Interview Summary, date of interview Dec. 4, 2008.

Piedmonte, C., "Systems and Methods for Data Manipulation Using Multiple Storage Formats," U.S. Appl. No. 11/383,479, filed May 5, 2006, Final Office Action dated Jan. 7, 2009.

Piedmonte, C., "Systems and Methods for Data Manipulation Using Multiple Storage Formats," U.S. Appl. No. 11/383,479, filed May 5, 2006, Response to Final Office Action dated Feb. 25, 2009.

Piedmonte, C., "Systems and Methods for Data Model Mapping," U.S. Appl. No. 11/383,480, filed May 15, 2006, Non Final Office Action dated Mar. 31, 2008.

Piedmonte, C., "Systems and Methods for Data Model Mapping," U.S. Appl. No. 11/383,480, filed May 15, 2006, Response to Non Final Office Action dated Sep. 29, 2008.

Piedmonte, C., "Systems and Methods for Data Model Mapping," U.S. Appl. No. 11/383,480, filed May 15, 2006, Interview Summary, date of interview Dec. 4, 2008.

Piedmonte, C., "Systems and Methods for Data Model Mapping," U.S. Appl. No. 11/383,480, filed May 15, 2006, Final Office Action dated Dec. 15, 2008.

Piedmonte, C., "Systems and Methods for Data Model Mapping," U.S. Appl. No. 11/383,480, filed May 15, 2006, Response to Final Office Action dated Feb. 13, 2009.

Piedmonte, C., "Systems and Methods for Data Model Mapping," U.S. Appl. No. 11/383,480, filed May 15, 2006, Office Action dated May 18, 2009.

Piedmonte, C., "Systems and Methods for Data Model Mapping," U.S. Appl. No. 11/383,480, filed May 15, 2006, Response to Office Action dated Sep. 21, 2009.

Piedmont, C., "Systems and Methods for Data Storage and Retrieval Using Virtual Data Sets," U.S. Appl. No. 11/383,482, filed May 15, 2006, Response to Office Action filed Aug. 3, 2009.

Piedmont, C., "Systems and Methods for Data Storage and Retrieval Using Virtual Data Sets," U.S. Appl. No. 11/383,482, filed May 15, 2006, Office Action dated Apr. 1, 2009.

Piedmont, C., "Systems and Methods for Data Storage and Retrieval Using Virtual Data Sets," U.S. Appl. No. 11/383,482, filed May 15, 2006, Final Office Action mailed Nov. 4, 2009.

Piedmont, C., "Systems and Methods for Data Storage and Retrieval Using Virtual Data Sets," U.S. Appl. No. 11/383,482, filed May 15, 2006, Response to Final Office Action dated Nov. 13, 2009.

Piedmont, C., "Systems and Methods for Data Storage and Retrieval Using Virtual Data Sets," U.S. Appl. No. 11/383,482, filed May 15, 2006, Office Action mailed Feb. 3, 2010.

Piedmont, C., "Systems and Methods for Data Storage and Retrieval Using Virtual Data Sets," U.S. Appl. No. 11/383,482, filed May 15, 2006, Response to Office Action dated Jul. 6, 2010.

* cited by examiner

```
select L_DISCOUNT, L_SHIPDATE, O_ORDERSTATUS          ┌─701
from LINEITEM, ORDERS where L_ORDERKEY =
O_ORDERKEY and L_ORDERKEY = '12345';
```

```
rdmProj( rdmRest( rdmJoin( LINEITEM, ORDERS, NULL),   ┌─702
{{{"EQ".<"1","const"."12345">},{"EQ".<"1","17">}}}),
<"7","11","19"> )
```

```
SQL000009,RDMPROJ (RDMJOIN                            ┌─704
(LINEITEM,ORDERS,{GUID(953609a2-4ff8-11da-8717-
00132066196a)}),{GUID(0b601696-4ff8-11da-8717-
00132066196a)})
```

SYSTEMS AND METHODS FOR DATA STORAGE AND RETRIEVAL USING ALGEBRAIC RELATIONS COMPOSED FROM QUERY LANGUAGE STATEMENTS

CROSS-REFERENCE

This application is a continuation of U.S. patent application Ser. No. 11/383,476, filed May 15, 2006, now U.S. Pat. No. 7,877,370 which is incorporated herein by reference in its entirety and to which application priority is claimed under 35 U.S.C. §120. This application is related to the following patents: U.S. Pat. No. 7,613,734, titled "Systems and Methods for Providing Data Sets Using a Store of Algebraic Relations", issued Nov. 3, 2009; U.S. Pat. No. 7,769,754, titled "Systems and Methods for Data Storage and Retrieval Using Algebraic Optimization", issued Aug. 3, 2010; U.S. Pat. No. 7,720,806, titled "Systems and Methods for Data Manipulation Using Multiple Storage Formats", issued May 18, 2010; U.S. Pat. No. 7,797,319 titled "Systems and Methods for Data Model Mapping", issued Sep. 14, 2010; and U.S. Pat. No. 7,865,503 titled "Systems and Methods for Data Storage and Retrieval Using Virtual Data Sets", issued Jan. 4, 2011, each of which are incorporated herein by reference in their entirety.

BACKGROUND OF THE INVENTION

I. Field

The field of the present invention relates to systems and methods for storing and accessing data, and more particularly to data storage, database queries and data retrieval.

II. Background

Many database and data storage systems have predetermined schema that impose a structure on data when it is received. The schema may not capture information regarding the structure of data as it is originally provided. In addition, the schema may be designed around predefined relationships that are not optimized for the way that data is actually provided or queried. The logical relationships inherent in the schema may also result in a database structure that is not optimized for the manner in which the data is actually stored. Moreover, the logical relationships inherent in the schema and/or their associated database structures may constrain the kinds of logical relationships that can be specified in data queries. A single query may require multiple accesses to storage resulting in significant inefficiencies, particularly given the increasing disparity between processing speeds and storage access speeds. While substantial efforts have been made to improve access methods for relational and other conventional databases, they are inherently limited by the predefined relationships and resulting structures imposed on the data. The tight coupling between these relationships and the structure of many databases also makes it difficult to efficiently capture, translate and process data provided in various different formats, such as flat files, comma separated value (CSV) files, and data defined using Extensible Markup Language (XML).

SUMMARY OF THE INVENTION

Aspects of the present invention provide systems and methods for storing and accessing data. Example embodiments may include a data store for storing data sets, a data set information store for storing information regarding the data sets, an algebraic relation store for storing algebraic relations between data sets, an optimizer for using the algebraic relations to optimize storage and access of data sets from the data store and a set processor for calculating algebraic relations to provide data sets. In example embodiments, modules may be provided by a combination of hardware, firmware and/or software and may use parallel processing and distributed storage in some example embodiments.

One aspect of the present invention provides a method for composing algebraic relations between data sets from query language statements. A query language statement may be presented to the system. For example, the query language statement may be in an structured query language (SQL) format using a relational data model or an XQuery format using a markup language format. A plurality of algebraic relations may then be composed from the query language statement and stored in an algebraic relation store. In a further aspect, algebraic relations between data sets may be accumulated in the relation store over time as statements are presented to the system. Alternative collections of algebraic relations may be generated and evaluated to determine an optimized collection of algebraic relations to use in calculating and providing a requested data set. The optimization may be performed using the algebraic relations rather than retrieving underlying data sets from storage. As a result, optimization may be performed at processor speeds to minimize the amount of time required for data to be retrieved from slower storage.

In another aspect, the query language statement requests a data set to be provided and the relation store includes other algebraic relations for data sets that are not composed from the query language statement. In some examples, both algebraic relations composed from the query language statement and other algebraic relations in the relation store may be used to provide the requested data set. In a further aspect, an optimizer may be used to generate a plurality of collections of algebraic relations defining a result equal to the requested data set, and optimization criteria may be applied to select one of the collections of algebraic relations to use in providing the requested data set. In example embodiments, the optimization criteria may be based on an estimate of the amount of data required to be transferred from storage and/or the amount of time required to transfer data sets from storage in order to calculate the collection of algebraic relations. In another example, the optimization criteria may distinguish among equivalent data sets containing the same logical data in different physical formats or in different locations in the data store.

In another aspect, the algebraic relations may be used to define new data sets. In an example embodiment, a data set information store may be provided for storing information regarding data sets. A new data set may be created by associating a data set identifier with the data set and storing the data set identifier in the data information store. In some examples, the new data set may be an explicit data set presented to the system as part of a query language statement.

In another aspect, a query language statement may specify one or more of the data sets that have not been stored in the data store at the time the query language statement is received. In some embodiments, data sets may be defined by algebraic relations without realizing the data set in storage.

In another aspect, temporal information is stored in the data set information store indicating the time at which the data set was created. In a further aspect, the data set information store may be temporally redefined by removing data sets from the data set information store that are associated with temporal information prior to a specified time. If an unrealized data set references a data set having temporal information prior to the specified time, the data set may be realized and stored in the data store before removal of the referenced data set.

In another aspect, a computer system is provided with one or more processors programmed to perform one or more of the above aspects of the invention. The computer system may include volatile and/or non-volatile storage to provide a data set store. In another aspect, one or more hardware accelerators or other circuitry is configured to perform one or more of the above aspects of the invention. In another aspect, a computer readable medium is provided with executable instructions for performing one or more of the above aspects of the invention.

It is understood that each of the above aspects of the invention may be used alone or in combination with other aspects of the invention. A more complete understanding of the present invention and other aspects and advantages thereof will be gained from a consideration of the following description of example embodiments read in conjunction with the accompanying drawings provided herein.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
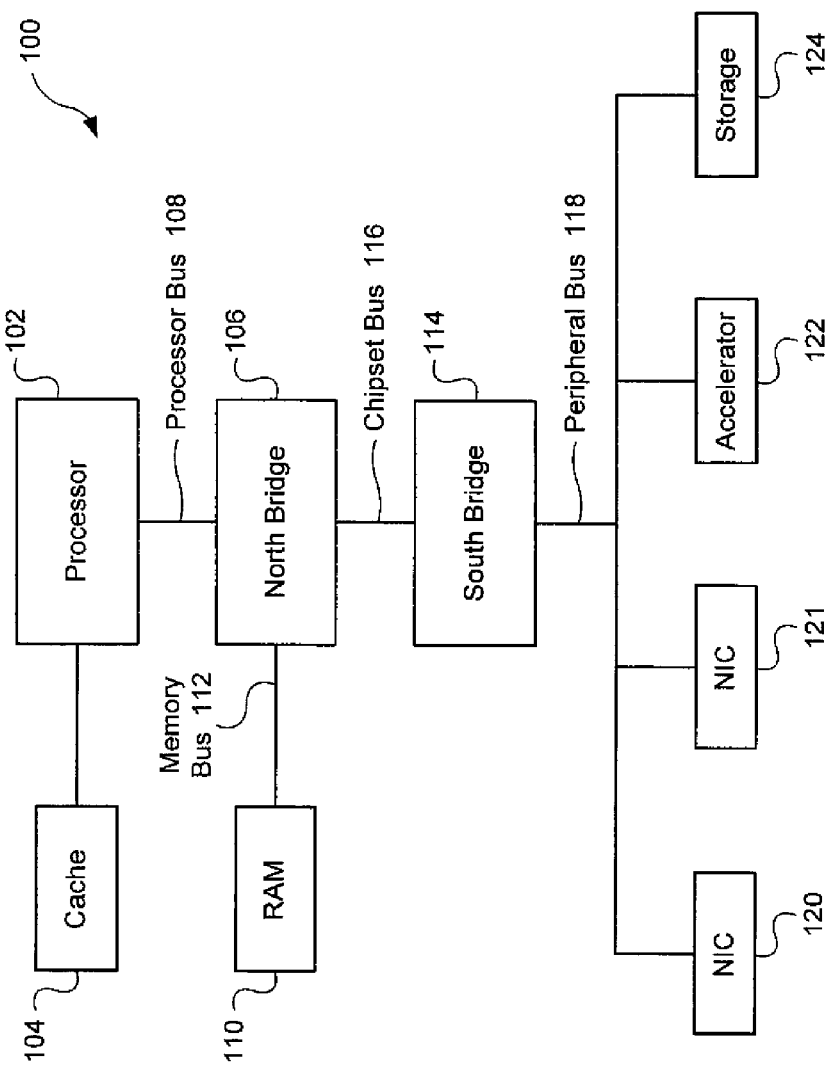
FIG. 1 is a block diagram showing a first example architecture of a computer system that may be used in connection with example embodiments of the present invention.

While the present invention is open to various modifications and alternative constructions, the embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

Example embodiments of the present invention provide systems and methods for data storage and processing using extended set processing and algebraic optimization. In one example, a universal data model based on extended set theory may be used to capture scalar, structural and temporal information from data provided in a wide variety of disparate formats. For example, data in fixed format, comma separated value (CSV) format, Extensible Markup Language (XML) and other formats may be captured and efficiently processed without loss of information. These encodings are referred to as physical formats. The same logical data may be stored in any number of different physical formats. Example embodiments may seamlessly translate between these formats while preserving the same logical data.

By using a rigorous mathematical data model, example embodiments can maintain algebraic integrity of data and their interrelationships, provide temporal invariance and enable adaptive data restructuring.

Algebraic integrity enables manipulation of algebraic relations to be substituted for manipulation of the information it models. For example, a query may be processed by evaluating algebraic expressions at processor speeds rather than requiring various data sets to be retrieved and inspected from storage at much slower speeds.

Temporal invariance may be provided by maintaining a constant value, structure and location of information until it is discarded from the system. Standard database operations such as "insert," "update" and "delete" functions create new data defined as algebraic expressions which may, in part, contain references to data already identified in the system. Since such operations do not alter the original data, example embodiments provide the ability to examine the information contained in the system as it existed at any time in its recorded history.

Adaptive data restructuring in combination with algebraic integrity allows the logical and physical structures of information to be altered while maintaining rigorous mathematical mappings between the logical and physical structures. Adaptive data restructuring may be used in example embodiments to accelerate query processing and to minimize data transfers between persistent storage and volatile storage.

Example embodiments may use these features to provide dramatic efficiencies in accessing, integrating and processing dynamically-changing data, whether provided in XML, relational or other data formats. Among other things, example embodiments may provide:

An independence from information structures that enables all types of enterprise information to be mathematically modeled and processed with equal facility and without extensive programming.

Elimination of data prestructuring and database extract, transform and load operations, as well as most database index structures and their associated storage.

Faster query processing via adaptive optimizations that eliminate redundant operations and reduce data transfers across the persistent/volatile storage-boundary performance barrier by adaptively restructuring working data sets.

Highly asynchronous and parallel internal operations that are scalable and fully leverage massively-parallel computing and storage systems.

Improved performance and increased fault tolerance resulting from stateless entity recording and consequent minimization of serially-reusable resources.

The ability to query databases as they existed at previous times in their recorded histories.

The mathematical data model allows example embodiments to be used in a wide variety of computer architectures and systems and naturally lends itself to massively-parallel computing and storage systems. Some example computer architectures and systems that may be used in connection with example embodiments will now be described.

FIG. 1 is a block diagram showing a first example architecture of a computer system 100 that may be used in connection with example embodiments of the present invention. As shown in FIG. 1, the example computer system may include a processor 102 for processing instructions, such as an Intel Xeon™ processor, AMD Opteron™ processor or other processor. Multiple threads of execution may be used for parallel processing. In some embodiments, multiple processors or processors with multiple cores may also be used, whether in a single computer system, in a cluster or distributed across systems over a network.

As shown in FIG. 1, a high speed cache 104 may be connected to, or incorporated in, the processor 102 to provide a high speed memory for instructions or data that have been recently, or are frequently, used by processor 102. The processor 102 is connected to a north bridge 106 by a processor bus 108. The north bridge 106 is connected to random access memory (RAM) 110 by a memory bus 112 and manages access to the RAM 110 by the processor 102. The north bridge 106 is also connected to a south bridge 114 by a chipset bus 116. The south bridge 114 is, in turn, connected to a peripheral bus 118. The peripheral bus may be, for example, PCI, PCI-X, PCI Express or other peripheral bus. The north bridge and south bridge are often referred to as a processor chipset and manage data transfer between the processor, RAM and peripheral components on the peripheral bus 118. In some alternative architectures, the functionality of the north bridge may be incorporated into the processor instead of using a separate north bridge chip.

In some embodiments, system 100 may include an accelerator card 122 attached to the peripheral bus 118. The accelerator may include field programmable gate arrays (FPGAs) or other hardware for accelerating certain processing. For example, an accelerator may be used for adaptive data restructuring or to evaluate algebraic expressions used in extended set processing.

Software and data are stored in external storage 124 and may be loaded into RAM 110 and/or cache 104 for use by the processor. The system 100 includes an operating system for managing system resources, such as Linux or other operating system, as well as application software running on top of the operating system for managing data storage and optimization in accordance with example embodiments of the present invention.

In this example, system 100 also includes network interface cards (NICs) 120 and 121 connected to the peripheral bus for providing network interfaces to external storage such as Network Attached Storage (NAS) and other computer systems that can be used for distributed parallel processing.

Figure 2:
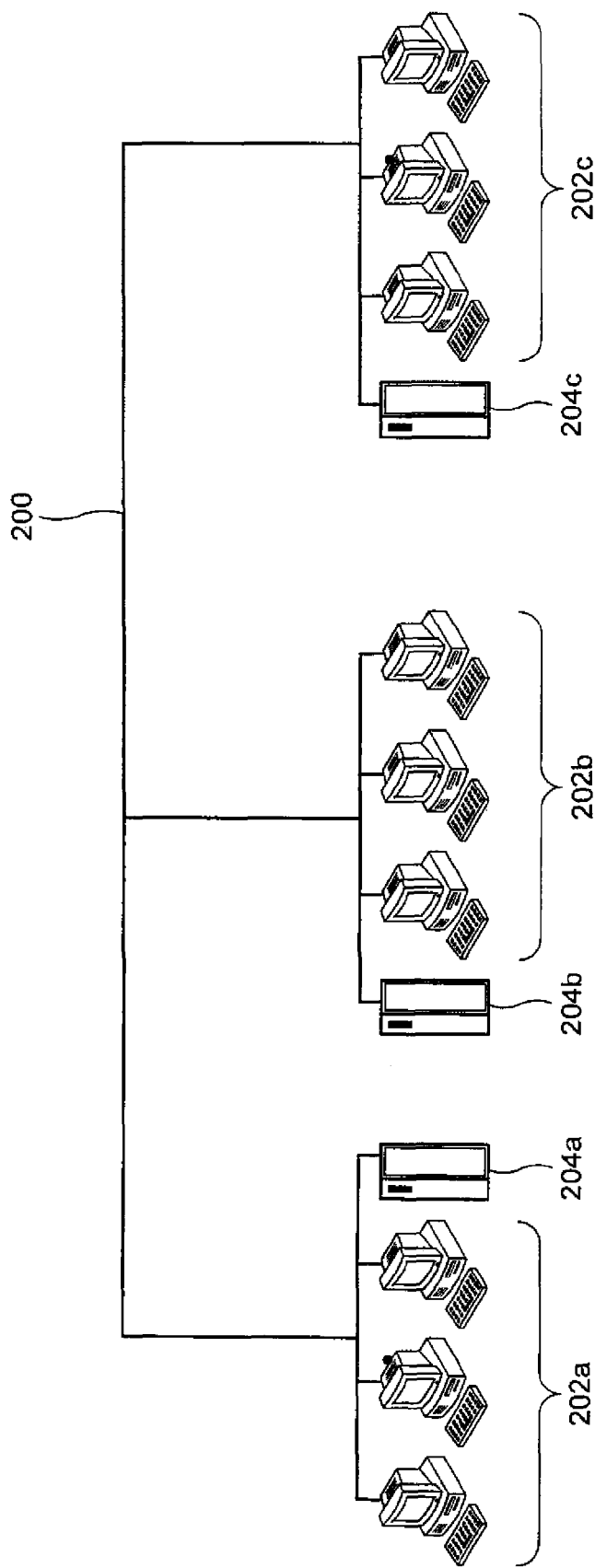
FIG. 2 is a block diagram showing a computer network that may be used in connection with example embodiments of the present invention.

FIG. 2 is a block diagram showing a network 200 with a plurality of computer systems 202 a, b and c and Network Attached Storage (NAS) 204 a, b and c. In example embodiments, computer systems 202 a, b and c may manage data storage and optimize data access for data stored in Network Attached Storage (NAS) 204 a, b and c. A mathematical model may be used for the data and be evaluated using distributed parallel processing across computer systems 202 a, b and c. Computer systems 202 a, b and c may also provide parallel processing for adaptive data restructuring of the data stored in Network Attached Storage (NAS) 204 a, b and c. This is an example only and a wide variety of other computer architectures and systems may be used. For example, a blade server may be used to provide parallel processing. Processor blades may be connected through a back plane to provide parallel processing. Storage may also be connected to the back plane or as Network Attached Storage (NAS) through a separate network interface.

In example embodiments, processors may maintain separate memory spaces and transmit data through network interfaces, back plane or other connectors for parallel processing by other processors. In other embodiments, some or all of the processors may use a shared virtual address memory space.

Figure 3:
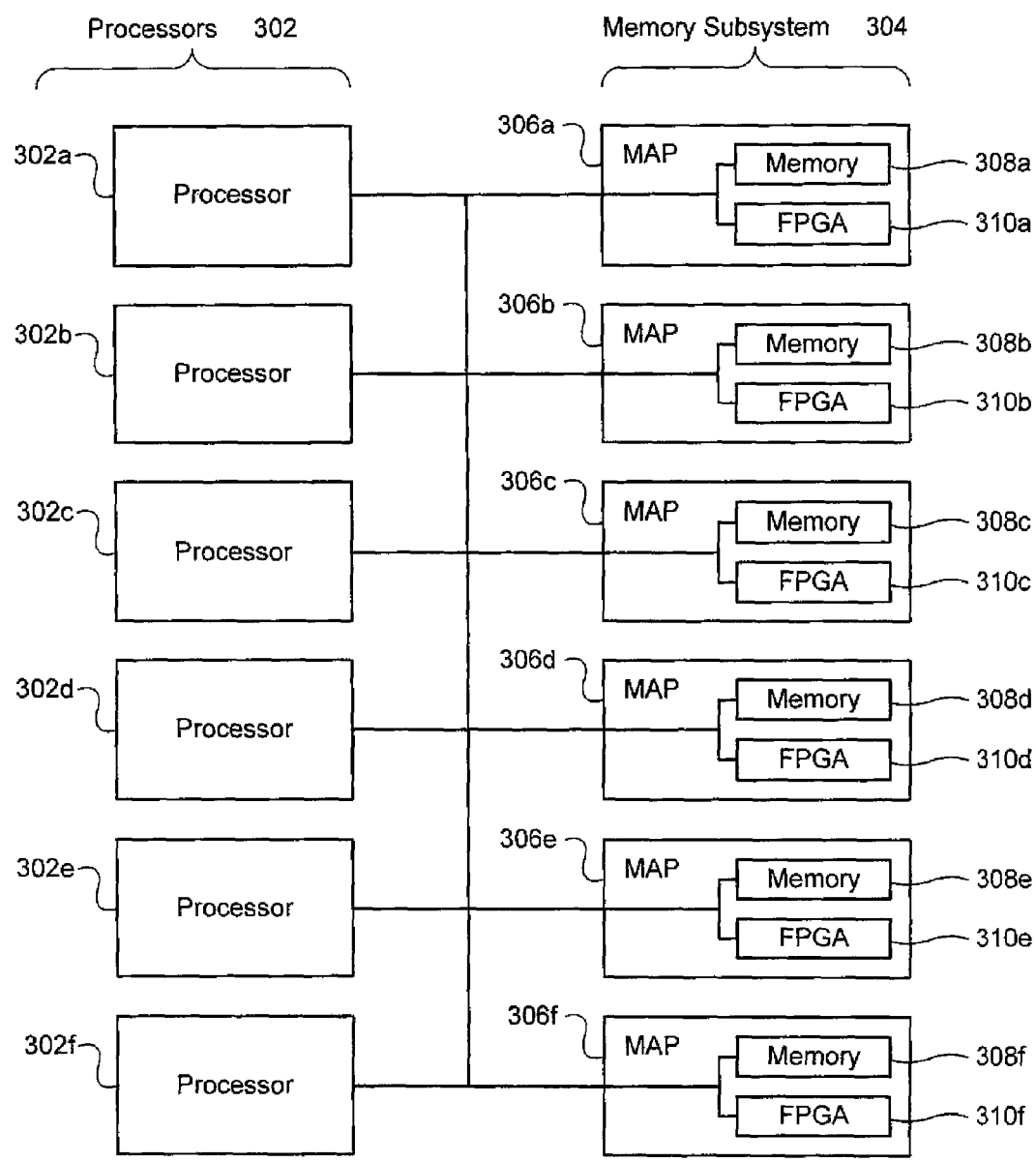
FIG. 3 is a block diagram showing a second example architecture of a computer system that may be used in connection with example embodiments of the present invention.

FIG. 3 is a block diagram of a multiprocessor computer system 300 using a shared virtual address memory space in accordance with an example embodiment. The system includes a plurality of processors 302a-f that may access a shared memory subsystem 304. The system incorporates a plurality of programmable hardware memory algorithm processors (MAPs) 306 a-f in the memory subsystem 304. Each MAP 306 a-f may comprise a memory 308a-f and one or more field programmable gate arrays (FPGAs) 310 a-f. The MAP provides a configurable functional unit and particular algorithms or portions of algorithms may be provided to the FPGAs 310 a-f for processing in close coordination with a respective processor. For example, the MAPs may be used to evaluate algebraic expressions regarding the data model and to perform adaptive data restructuring in example embodiments. In this example, each MAP is globally accessible by all of the processors for these purposes. In one configuration, each MAP can use Direct Memory Access (DMA) to access an associated memory 308a-f, allowing it to execute tasks independently of, and asynchronously from, the respective microprocessor 302a-f. In this configuration, a MAP may feed results directly to another MAP for pipelining and parallel execution of algorithms.

The above computer architectures and systems are examples only and a wide variety of other computer architectures and systems can be used in connection with example embodiments, including systems using any combination of general processors, co-processors, FPGAs and other programmable logic devices, system on chips (SOCs), application specific integrated circuits (ASICs) and other processing and logic elements. It is understood that all or part of the data management and optimization system may be implemented in software or hardware and that any variety of data storage media may be used in connection with example embodiments, including random access memory, hard drives, flash memory, tape drives, disk arrays, Network Attached Storage (NAS) and other local or distributed data storage devices and systems.

In example embodiments, the data management and optimization system may be implemented using software modules executing on any of the above or other computer architectures and systems. In other embodiments, the functions of the system may be implemented partially or completely in firmware, programmable logic devices such as field programmable gate arrays (FPGAs) as referenced in FIG. 3, system on chips (SOCs), application specific integrated circuits (ASICs), or other processing and logic elements. For example, the Set Processor and Optimizer may be implemented with hardware acceleration through the use of a hardware accelerator card, such as accelerator card 122 illustrated in FIG. 1.

Figure 4A:
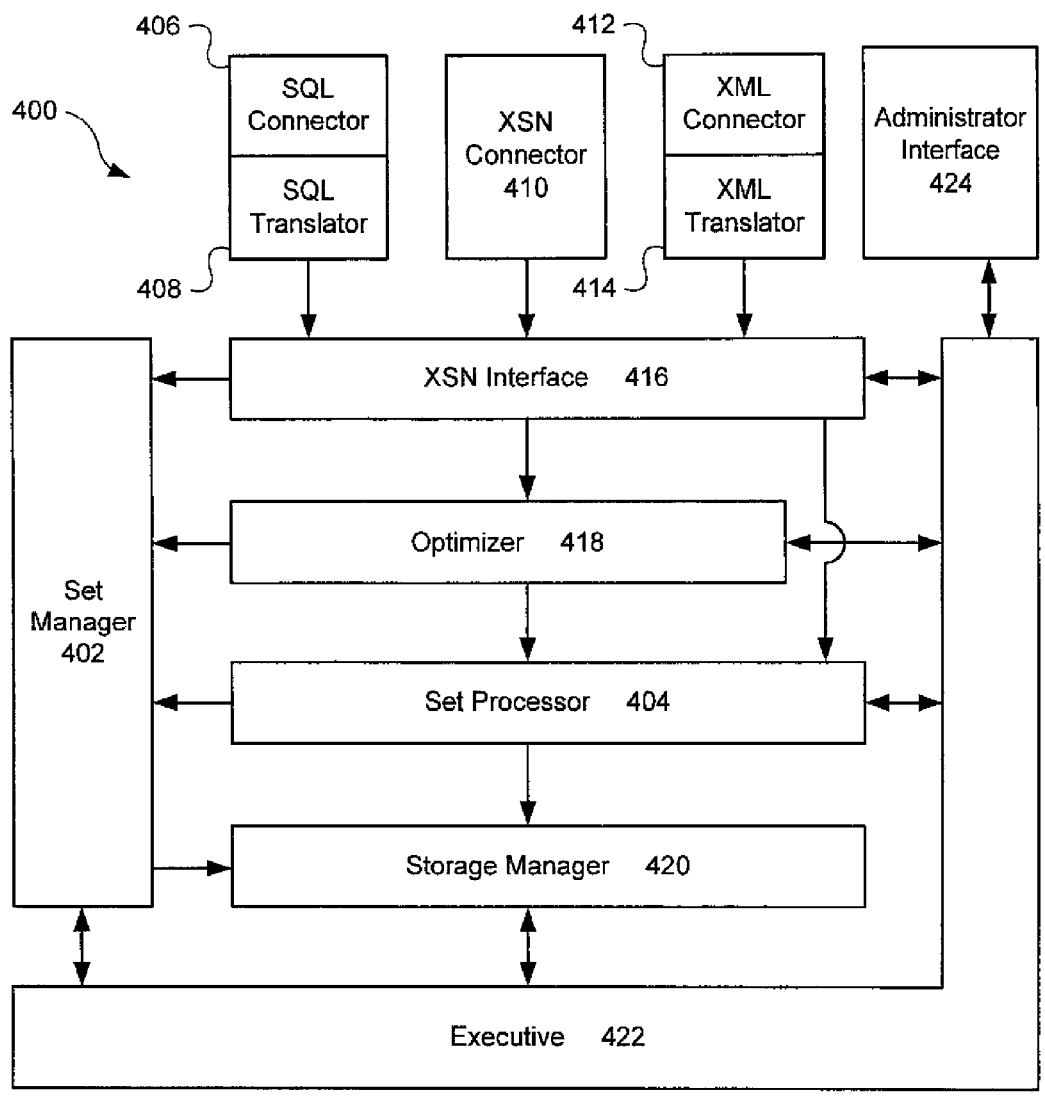
FIG. 4A is a block diagram illustrating the logical architecture of an example embodiment of the present invention.

FIG. 4A is a block diagram illustrating the logical architecture of example software modules 400. The software is also component-based and organized into modules that encapsulate specific functionality as shown in FIG. 4A. This is an example only and other software architectures may be used as well.

In this example embodiment, data natively stored in one or more various physical formats may be presented to the system. The system creates a mathematical representation of the data based on extended set theory and may assign the mathematical representation a Global Unique Identifier (GUID) for unique identification within the system. In this example embodiment, data is internally represented in the form of algebraic expressions applied to one or more data sets, where the data may or may not be defined at the time the algebraic expression is created. The data sets include sets of data elements, referred to as members of the data set. In an example embodiment, the elements may be data values or algebraic expressions formed from combinations of operators, values and/or other data sets. In this example, the data sets are the operands of the algebraic expressions. The algebraic relations defining the relationships between various data sets are stored and managed by a Set Manager 402 software module. Algebraic integrity is maintained in this embodiment, because all of the data sets are related through specific algebraic relations. A particular data set may or may not be stored in the system. Some data sets may be defined solely by algebraic relations with other data sets and may need to be calculated in order to retrieve the data set from the system. Some data sets may even be defined by algebraic relations referencing data sets that have not yet been provided to the system and cannot be calculated until those data sets are provided at some future time.

In an example embodiment, the algebraic relations and GUIDs for the data sets referenced in those algebraic relations are not altered once they have been created and stored in the Set Manager 402. This provides temporal invariance which enables data to be managed without concerns for locking or other concurrency-management devices and related overheads. Algebraic relations and the GUIDs for the corresponding data sets are only appended in the Set Manager 402 and not removed or modified as a result of new operations. This results in an ever-expanding universe of operands and algebraic relations, and the state of information at any time in its recorded history may be reproduced. In this embodiment, a separate external identifier may be used to refer to the same logical data as it changes over time, but a unique GUID is used to reference each instance of the data set as it exists at a particular time. The Set Manager 402 may associate the GUID with the external identifier and a time stamp to indicate the time at which the GUID was added to the system. The Set Manager 402 may also associate the GUID with other information regarding the particular data set. This information may be stored in a list, table or other data structure in the Set Manager 402 (referred to as the Set Universe in this example embodiment). The algebraic relations between data sets may also be stored in a list, table or other data structure in the Set Manager 402 (referred to as the Algebraic Cache in this example embodiment).

In some embodiments, Set Manager 402 can be purged of unnecessary or redundant information, and can be temporally redefined to limit the time range of its recorded history. For example, unnecessary or redundant information may be automatically purged and temporal information may be periodically collapsed based on user settings or commands. This may be accomplished by removing all GUIDs from the Set Manager 402 that have a time stamp before a specified time. All algebraic relations referencing those GUIDs are also removed from the Set Manager 402. If other data sets are defined by algebraic relations referencing those GUIDs, those data sets may need to be calculated and stored before the algebraic relation is removed from the Set Manager 402.

In one example embodiment, data sets may be purged from storage and the system can rely on algebraic relations to recreate the data set at a later time if necessary. This process is called virtualization. Once the actual data set is purged, the storage related to such data set can be freed but the system maintains the ability to identify the data set based on the algebraic relations that are stored in the system. In one example embodiment, data sets that are either large or are referenced less than a certain threshold number of times may be automatically virtualized. Other embodiments may use other criteria for virtualization, including virtualizing data sets that have had little or no recent use, virtualizing data sets to free up faster memory or storage or virtualizing data sets to enhance security (since it is more difficult to access the data set after it has been virtualized without also having access to the algebraic relations). These settings could be user-configurable or system-configurable. For example, if the Set Manager 402 contained a data set A as well as the algebraic relation that A equals the intersection of data sets B and C, then the system could be configured to purge data set A from the Set Manager 402 and rely on data sets B and C and the algebraic relation to identify data set A when necessary. In another example embodiment, if two or more data sets are equal to one another, all but one of the data sets could be deleted from the Set Manager 402. This may happen if multiple sets are logically equal but are in different physical formats. In such a case, all but one of the data sets could be removed to conserve physical storage space.

When the value of a data set needs to be calculated or provided by the system, an Optimizer 418 may retrieve algebraic relations from the Set Manager 402 that define the data set. The Optimizer 418 can also generate additional equivalent algebraic relations defining the data set using algebraic relations from the Set Manager 402. Then the most efficient algebraic relation can then be selected for calculating the data set.

A Set Processor 404 software module provides an engine for performing the arithmetic and logical operations and functions required to calculate the values of the data sets represented by algebraic expressions and to evaluate the algebraic relations. The Set Processor 404 also enables adaptive data restructuring. As data sets are manipulated by the operations and functions of the Set Processor 404, they are physically and logically processed to expedite subsequent operations and functions. The operations and functions of the Set Processor 404 are implemented as software routines in one example embodiment. However, such operations and functions could also be implemented partially or completely in firmware, programmable logic devices such as field programmable gate arrays (FPGAs) as referenced in FIG. 3, system on chips (SOCs), application specific integrated circuits (ASICs), or other hardware or a combination thereof.

The software modules shown in FIG. 4A will now be described in further detail. As shown in FIG. 4A, the software includes Set Manager 402 and Set Processor 404 as well as SQL Connector 406, SQL Translator 408, XSN Connector 410, XML Connector 412, XML Translator 414, XSN Interface 416, Optimizer 418, Storage Manager 420, Executive 422 and Administrator Interface 424.

In the example embodiment of FIG. 4A, queries and other statements about data sets are provided through one of three connectors, SQL Connector 406, XSN Connector 410 or XML Connector 412. Each connector receives and provides statements in a particular format. In one example, SQL Connector 406 provides a standard SQL92-compliant ODBC connector to user applications and ODBC-compliant third-party relational database systems, and XML Connector 412 provides a standard Web Services W3C XQuery-compliant connector to user applications, compliant third-party XML systems, and other instances of the software 400 on the same or other systems. SQL and XQuery are example formats for providing query language statements to the system, but other formats may also be used. Query language statements provided in these formats are translated by SQL Translator 408 and XML Translator 414 into an extended set notation (XSN) format that is used by the system. XSN Connector 410 provides a connector for receiving statements directly in an XSN format. An Example Extended Set Notation is described at the end of this specification below. The Example Extended Set Notation includes a syntax in which statements regarding extended data sets may be presented to the system. The Example Extended Set Notation is an example only and other notations may be used in other embodiments. Other embodiments may also use different types and formats of data sets and algebraic relations to capture information from statements provided to the system.

XSN Interface 416 provides a single point of entry for all statements from the connectors. The statements are provided from SQL Translator 408, XML Translator 414 or XSN Connector 410 in an XSN format. The statements are provided using a text based description of extended set notation. The XSN Interface 416 provides a parser that converts the text description into an internal representation that is used by the system. In one example, the internal representation uses an XSN tree data structure, as described further below. As the XSN statements are parsed, the XSN Interface 416 may call the Set Manager 402 to assign GUIDs to the data sets referenced in the statements. The overall algebraic relation representing the XSN statement may also be parsed into components that are themselves algebraic relations. In an example embodiment, these components may be algebraic relations with an expression composed of a single operation that reference from one to three data sets. Each algebraic relation may be stored in the Algebraic Cache in the Set Manager 402. A GUID may be added to the Set Universe for each new algebraic expression, representing a data set defined by the algebraic expression. The XSN Interface 416 thereby composes a plurality of algebraic relations referencing the data sets specified in statements presented to the system as well as new data sets that may be created as the statements are parsed. In this manner, the XSN Interface 416 and Set Manager 402 capture information from the statements presented to the system. These data sets and algebraic relations can then be used for algebraic optimization when data sets need to be calculated by the system.

Figure 4B:
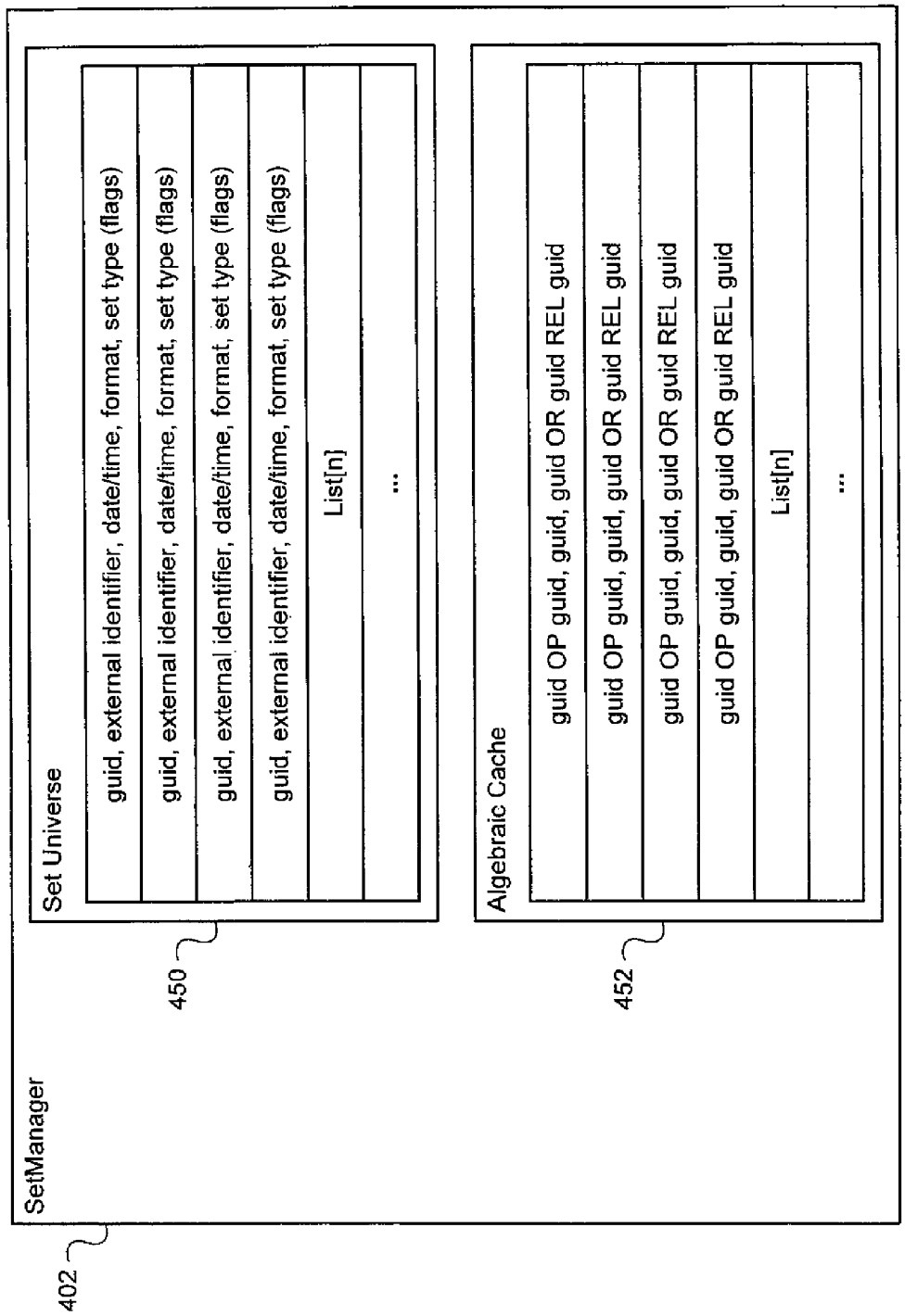
FIG. 4B is a block diagram illustrating the information stored in a set manager module of an example embodiment of the present invention.

The Set Manager 402 provides a data set information store for storing information regarding the data sets known to the system, referred to as the Set Universe in this example. The Set Manager 402 also provides a relation store for storing the relationships between the data sets known to the system, referred to as the Algebraic Cache in this example. FIG. 4B illustrates the information maintained in the Set Universe 450 and Algebraic Cache 452 according to an example embodiment. Other embodiments may use a different data set information store to store information regarding the data sets or a different relation store to store information regarding algebraic relations known to the system.

As shown in FIG. 4B, the Set Universe 450 may maintain a list of GUIDs for the data sets known to the system. Each GUID is a unique identifier for a data set in the system. The Set Universe 450 may also associate information about the particular data set with each GUID. This information may include, for example, an external identifier used to refer to the data set (which may or may not be unique to the particular data set) in statements provided through the connectors, a date/time indicator to indicate the time that the data set became known to the system, a format field to indicate the format of the data set, and a set type with flags to indicate the type of the data set. The format field may indicate a logical to physical translation model for the data set in the system. For example, the same logical data is capable of being stored in different physical formats on storage media in the system. As used herein, the physical format refers to the format for encoding the logical data when it is stored on storage media and not to the particular type of physical storage media (e.g., disk, RAM, flash memory, etc.) that is used. The format field indicates how the logical data is mapped to the physical format on the storage media. For example, a data set may be stored on storage media in comma separated value (CSV) format, binary-string encoding (BSTR) format, fixed-offset (FIXED) format, type-encoded data (TED) format and/or markup language format. Type-encoded data (TED) is a file format that contains data and an associated value that indicates the format of such data. These are examples only and other physical formats may be used in other embodiments. While the Set Universe stores information about the data sets, the underlying data may be stored elsewhere in this example embodiment, such as storage 124 in FIG. 1, Network Attached Storage 204 a, b and c in FIG. 2, memory 308 a-f in FIG. 3 or other storage. Some data sets may not exist in physical storage, but may be calculated from algebraic relations known to the system. In some cases, data sets may even be defined by algebraic relations referencing data sets that have not yet been provided to the system and cannot be calculated until those data sets are provided at some future time. The set type may indicate whether the data set is available in storage, referred to as realized, or whether it is defined by algebraic relations with other data sets, referred to as virtual. Other types may also be supported in some embodiments, such as a transitional type to indicate a data set that is in the process of being created or removed from the system. These are examples only and other information about data sets may also be stored in a data set information store in other embodiments.

As shown in FIG. 4B, the Algebraic Cache 452 may maintain a list of algebraic relations relating one data set to another. In the example shown in FIG. 4B, an algebraic relation may specify that a data set is equal to an operation or function performed on one to three other data sets (indicated as "guid OP guid guid guid" in FIG. 4B). Example operations and functions include a projection function, inversion function, cardinality function, join function and restrict function. Additional examples are described at the end of this specification as part of the Example Extended Set Notation. An algebraic relation may also specify that a data set has a particular relation to another data set (indicated as "guid REL guid" in FIG. 4B). Example relational operators include equal, subset and disjoint as well as their negations, as further described at the end of this specification as part of the Example Extended Set Notation. These are examples only and other operations, functions and relational operators may be used in other embodiments, including functions that operate on more than three data sets.

The Set Manager 402 may be accessed by other modules to add new GUIDS for data sets and retrieve know relationships between data sets for use in optimizing and evaluating other algebraic relations. For example, the system may receive a query language statement specifying a data set that is the intersection of a first data set A and a second data set B. The resulting data set C may be determined and may be returned by the system. In this example, the modules processing this request may call the Set Manager 402 to obtain known relationships from the Algebraic Cache for data sets A and B that may be useful in evaluating the intersection of data sets A and B. It may be possible to use known relationships to determine the result without actually retrieving the underlying data for data sets A and B from the storage system. The Set Manager 402 may also create a new QUID for data set C and store its relationship in the Algebraic Cache (i.e., data set C is equal to the intersection of data sets A and B). Once this relationship is added to the Algebraic Cache, it is available for use in future optimizations and calculations. All data sets and algebraic relations may be maintained in the Set Manager 402 to provide temporal invariance. The existing data sets and algebraic relations are not deleted or altered as new statements are received by the system. Instead, new data sets and algebraic relations are composed and added to the Set Manager 402 as new statements are received. For example, if data is requested to be removed from a data set, a new GUID can be added to the Set Universe and defined in the Algebraic Cache as the difference of the original data set and the data to be removed.

The Optimizer 418 receives algebraic expressions from the XSN Interface 416 and optimizes them for calculation. When a data set needs to be calculated (e.g., for purposes of realizing it in the storage system or returning it in response to a request from a user), the Optimizer 418 retrieves an algebraic relation from the Algebraic Cache that defines the data set. The Optimizer 418 can then generate a plurality of collections of other algebraic relations that define an equivalent data set. Algebraic substitutions may be made using other algebraic relations from the Algebraic Cache and algebraic operations may be used to generate relations that are algebraically equivalent. In one example embodiment, all possible collections of algebraic relations are generated from the information in the Algebraic Cache that define a data set equal to the specified data set.

The Optimizer 418 may then determine an estimated cost for calculating the data set from each of the collections of algebraic relations. The cost may be determined by applying a costing function to each collection of algebraic relations, and the lowest cost collection of algebraic relations may be used to calculate the specified data set. In one example embodiment, the costing function determines an estimate of the time required to retrieve the data sets from storage that are required to calculate each collection of algebraic relations and to store the results to storage. If the same data set is referenced more than once in a collection of algebraic relations, the cost for retrieving the data set may be allocated only once since it will be available in memory after it is retrieved the first time. In this example, the collection of algebraic relations requiring the lowest data transfer time is selected for calculating the requested data set.

The Optimizer 418 may generate different collections of algebraic relations that refer to the same logical data stored in different physical locations over different data channels and/or in different physical formats. While the data may be logically the same, different data sets with different GUIDs may be used to distinguish between the same logical data in different locations or formats. The different collections of algebraic relations may have different costs, because it may take a different amount of time to retrieve the data sets from different locations and/or in different formats. For example, the same logical data may be available over the same data channel but in a different format. Example formats may include comma separated value (CSV) format, binary-string encoding (BSTR) format, fixed-offset (FIXED) format, type-encoded data (TED) format and markup language format. Other formats may also be used. If the data channel is the same, the physical format with the smallest size (and therefore the fewest number of bytes to transfer from storage) may be selected. For instance, a comma separated value (CSV) format is often smaller than a fixed-offset (FIXED) format. However, if the larger format is available over a higher speed data channel, it may be selected over a smaller format. In particular, a larger format available in a high speed, non-volatile memory such as a DRAM would generally be selected over a smaller format available on lower speed non-volatile storage such as a disk drive or flash memory.

In this way, the Optimizer 418 takes advantage of high processor speeds to optimize algebraic relations without accessing the underlying data for the data sets from data storage. Processor speeds for executing instructions are often higher than data access speeds from storage. By optimizing the algebraic relations before they are calculated, unnecessary data access from storage can be avoided. The Optimizer 418 can consider a large number of equivalent algebraic relations and optimization techniques at processor speeds and take into account the efficiency of data accesses that will be required to actually evaluate the expression. For instance, the system may receive a query requesting data that is the intersection of data sets A, B and D. The Optimizer 418 can obtain known relationships regarding these data sets from the Set Manager 402 and optimize the expression before it is evaluated. For example, it may obtain an existing relation from the Algebraic Cache indicating that data set C is equal to the intersection of data sets A and B. Instead of calculating the intersection of data sets A, B and D, the Optimizer 418 may determine that it would be more efficient to calculate the intersection of data sets C and D to obtain the equivalent result. In making this determination, the Optimizer 418 may consider that data set C is smaller than data sets A and B and would be faster to obtain from storage or may consider that data set C had been used in a recent operation and has already been loaded into higher speed memory or cache.

The Optimizer 418 may also continually enrich the information in the Set Manager 402 via submissions of additional relations and sets discovered through analysis of the sets and Algebraic Cache. This process is called comprehensive optimization. For instance, the Optimizer 418 may take advantage of unused processor cycles to analyze relations and data sets to add new relations to the Algebraic Cache and sets to the Set Universe that are expected to be useful in optimizing the evaluation of future requests. Once the relations have been entered into the Algebraic Cache, even if the calculations being performed by the Set Processor 404 are not complete, the Optimizer 418 can make use of them while processing subsequent statements. There are numerous algorithms for comprehensive optimization that may be useful. These algorithms may be based on the discovery of repeated calculations on a limited number of sets that indicate a pattern or trend of usage emerging over a recent period of time.

The Set Processor 404 actually calculates the selected collection of algebraic relations after optimization. The Set Processor 404 provides the arithmetic and logical processing required to realize data sets specified in algebraic extended set expressions. In an example embodiment, the Set Processor 404 provides a collection of functions that can be used to calculate the operations and functions referenced in the algebraic relations. The collection of functions may include functions configured to receive data sets in a particular physical format. In this example, the Set Processor 404 may provide multiple different algebraically equivalent functions that operate on data sets and provide results in different physical formats. The functions that are selected for calculating the algebraic relations correspond to the format of the data sets referenced in those algebraic relations (as may be selected during optimization by the Optimizer 418). In example embodiments, the Set Processor 404 is capable of parallel processing of multiple simultaneous operations, and, via the Storage Manager 420, allows for pipelining of data input and output to minimize the total amount of data that is required to cross the persistent/volatile storage boundary. In particular, the algebraic relations from the selected collection may be allocated to various processing resources for parallel processing. These processing resources may include processor 102 and accelerator 122 shown in FIG. 1, distributed computer systems as shown in FIG. 2, multiple processors 302 and MAPs 306 as shown in FIG. 3, or multiple threads of execution on any of the foregoing. These are examples only and other processing resources may be used in other embodiments.

The Executive 422 performs overall scheduling of execution, management and allocation of computing resources, and proper startup and shutdown.

Administrator Interface 424 provides an interface for managing the system. In example embodiments, this may include an interface for importing or exporting data sets. While data sets may be added through the connectors, the Administrator Interface 424 provides an alternative mechanism for importing a large number of data sets or data sets of very large size. Data sets may be imported by specifying the location of the data sets through the interface. The Set Manager 402 may then assign a GUID to the data set. However, the underlying data does not need to be accessed until a request is received that requires the data to be accessed. This allows for a very quick initialization of the system without requiring data to be imported and reformatted into a particular structure. Rather, relationships between data sets are defined and added to the Algebraic Cache in the Set Manager 402 as the data is actually queried. As a result, optimizations are based on the actual way the data is used (as opposed to predefined relationships built into a set of tables or other predefined data structures).

Example embodiments may be used to manage large quantities of data. For instance, the data store may include more than a terabyte, one hundred terabytes or a petabyte of data or more. The data store may be provided by a storage array or distributed storage system with a large storage capacity. The data set information store may, in turn, define a large number of data sets. In some cases, there may be more than a million, ten million or more data sets defined in the data information store. In one example embodiment, the software may scale to $2^{64}$ data sets, although other embodiments may manage a smaller or larger universe of data sets. Many of these data sets may be virtual and others may be realized in the data store. The entries in the data set information store may be scanned from time to time to determine whether additional data sets should be virtualized or whether to remove data sets to temporally redefine the data sets captured in the data set information store. The relation store may also include a large number of algebraic relations between data sets. In some cases, there may be more than a million, ten million or more algebraic relations included in the relation store. In some cases, the number of algebraic relations may be greater than the number of data sets. The large number of data sets and algebraic relations represent a vast quantity of information that can be captured about the data sets in the data store and allow extended set processing and algebraic optimization to be used to efficiently manage extremely large amounts of data. The above are examples only and other embodiments may manage a different number of data sets and algebraic relations.

Figure 5:
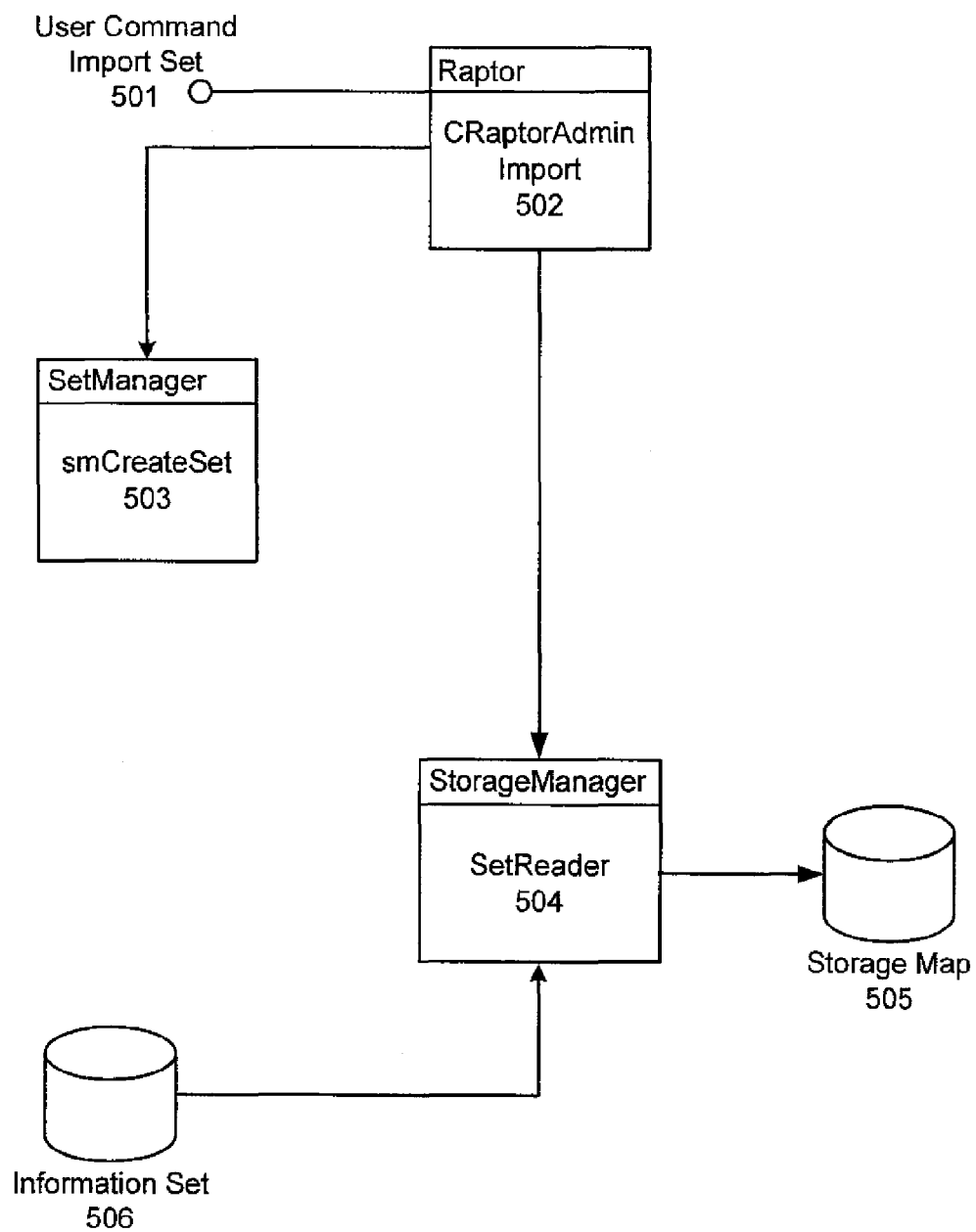
FIG. 5 is a flow chart of a method for submitting data sets in accordance with an example embodiment of the present invention.

FIG. 5 is a block diagram illustrating one example embodiment of a software module implemented to facilitate importing information into the system. Unlike conventional database systems, the system does not immediately operate on the data sets presented. Rather, the system records a reference to the new data set in a data set information store. In an example embodiment, this is accomplished by adding a new GUM to the Set Universe. Once the data sets are known to the Set Universe, they can be used by the system.

As mentioned previously, information may be added to the system through the functions contained within the Administrative Interface 424 and described in further detail below. One such method to add information to the system is by issuing a command 501 to the import function 502 to import an information set 506. In one embodiment, the command includes the physical location of the data set to be imported, the external identifier, and a value indicating the logical to physical mapping that the data set employs to encode the data for storage. A variety of physical formats can be supported, including comma-separate value (CSV) files, extensible markup language (XML) files, fixed length files (FIXED), XSN formatted files, and others. In addition, the information set may be located on a variety of persistent or volatile storage media and may be locally attached or remotely accessed via a network or other communication methods. The information set could also be distributed across a plurality of different physical storage media or may be provided from a real-time data stream, such as data packets received over a network or input from a user (e.g., to be input by an end user in real time). After the command is issued, the import function 502 parses the command and causes the Set Manager 503 to create a data set with the associated external identifier and physical format value. The Set Manager 503 then creates a GUID for the associated data set and enters various information into the Set Universe, including the physical format type value, the external identifier, the associated GUID, and the fact that the GUID is realized. The Import Function 502 then calls the Storage Manager 504 to create an association between the data set's physical location identifier and the GUID assigned by the Set Manager 503. Specifically, the Storage Manager 504 adds an index record to the Storage Map 505 that contains the physical path of the data and the associated GUID. The data set 506 is now imported into the system and control is returned to the caller. Information about data sets may also be captured by the system even if the data set has not been realized on storage (i.e., it is virtual). For instance, a data set C may be defined as the union of data sets A and B. Data sets A and B may be realized in storage, but data set C may only be defined by the relation "C=A UNION B" in the Algebraic Cache and may not be realized in storage at the time that a GUID for data set C is added to the Set Universe.

Statement submission is the process of providing an assignment or relation to the system. Statements may be submitted to the system through a variety of interfaces. In one example embodiment, three interfaces are provided: an SQL connector for submitting standard SQL92-compliant statements an XSN connector for submitting statements using XSN, and an XML connector for submitting Web Services W3C XQuery-compliant and other XML-based statements.

Figure 6:
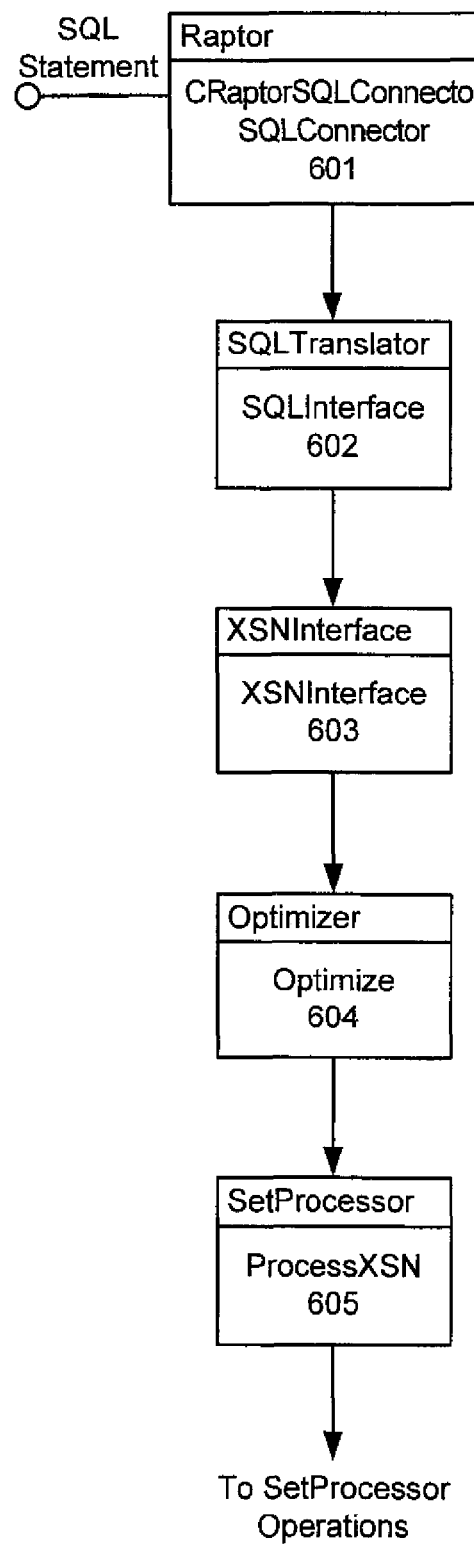
FIG. 6 is a flow chart of a method for submitting statements in accordance with an example embodiment of the present invention.

FIG. 6 is a block diagram illustrating one example embodiment of how a software module may be implemented to facilitate submitting statements to the system. In this example, a standard SQL command is submitted to the system through the SQL Connector 601. The SQL command may contain one more standard SQL92-compliant SQL statements. The SQL Connector 601 first captures the time of the submission in order to establish the temporal value for all sets contained within the statements submitted. The command is then parsed in order to validate that the syntax of the SQL statements is correct. If there are any syntax or compliance errors, an error message is returned to the caller and the submission is discontinued. If there are no errors, the SQL Connector 601 then constructs an internal navigable representation of the SQL command that is outputted to the SQL Translator 602. The SQL Translator 602 then converts the internal navigable representation of the SQL command into the appropriate equivalent XSN statements. After the translation, the resulting XSN statements are passed to the XSN Interface 603 for further processing. Each statement is then converted from its textual XSN representation to an internal structure referred to as an XSN tree, The XSN tree provides a means for programmatically examining the members of the XSN statement as well as a means for navigating the elements of the statement.

The XSN tree is then examined to determine if the statement represents an assignment or a relation. If the statement is an assignment, a GUID is assigned by the Set Manager 402 to the algebraic expression specified in the statement. Then the XSN tree is examined to assign GUIDs to all data sets and operations within the expression and to determine if the expression includes any explicit sets or any redundant assignments. Explicit sets are sets that are inputted into the system as part of the statement, such as may occur in the context of a standard SQL "insert" statement. Redundant assignments are assignments that contain operations and arguments that are already in the Algebraic Cache. In the case of explicit sets, these sets are assigned a new GUID by the Set Manager 402 and immediately realized by the Set Processor 404. In the case of redundant assignments, which are discovered by searching the Algebraic Cache for expressions that contain the same operation and right values (rvalues), the GUID of left value (lvalue) of the existing assignment entry in the Algebraic Cache is retrieved from the Set Manager 402 and assigned to the lvalue of the redundant assignment within the expression. If an assignment is not redundant, a new GUID is provided for the assignment from the Set Manager 402 and assigned to lvalue of the assignment within the expression. Complex algebraic relations specified by the statement may also be decomposed into a collection of primitive (atomic) relations and assignments. GUIDs may be provided for these relations and assignments and the corresponding algebraic relations may be added to the Algebraic Cache.

Once all explicit sets and assignment lvalues have been assigned GUIDs, control is then returned to the SQL Connector 601. If necessary, a second call is then made to the XSN Interface 603 to realize any sets that are expected to be returned to the caller. The realized sets are then returned to the caller.

Figure 7:
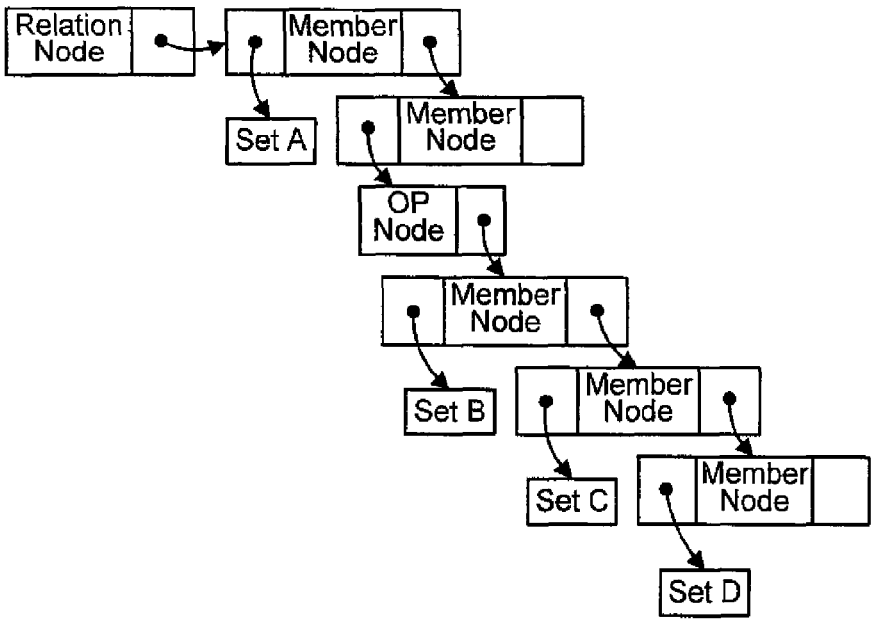
FIG. 7 illustrates an example statement and XSN tree for the method of FIG. 6.

FIG. 7 illustrates an example of a statement that may be submitted to the system for the method of FIG. 6. In this example, a user is querying the database for certain information related to a standard commercial transaction. The request is represented by the standard SQL statement 701. The ORDERKEY being requested in this case is "12345." Specifically, the user in this example is requesting the discount, ship date, and comment for items in a particular customer order numbered "12345." The information is obtained from two tables, LINEITEM and ORDERS. The two tables will be joined based on the L_ORDERKEY field being equal to the O_ORDERKEY field. SQL statement 701 is passed to the SQL Connector 601 by the user. The SQL Translator 602 converts the internal navigable representation of the SQL statement into the appropriate equivalent XSN statement 702. Note that the columns or fields of the LINEITEM and ORDERS tables have been converted into representations that are not specific to relational databases. Specifically, the columns or fields of the LINEITEM table are now represented by domains "1" through "16" and the columns or fields of the ORDERS table are now represented by domains "17" and above. Starting from the inner-most function in the equation, the join operation of SQL statement 701 has been converted into the rdmJoin operation, with LINEITEM, ORDERS, and NULL being passed as the three parameters. The result of the rdmJoin is then passed to the rdmRest operation which restricts the data resulting from the join operation to only the data in which domain "1", the L_ORDERKEY domain of the LINEITEM dataset, is equal to the constant "12345" and domain "1", the L_ORDERKEY field from the LINEITEM dataset, is also equal to domain "17", the O_ORDERKEY domain from the ORDERS dataset. The XSN statement 702 is then passed to the XSN Interface for further processing.

The XSN Interface 603 records the time of the submission in order to establish the temporal value for the sets contained within the statement submitted. The statement is then converted from the XSN statement 702 into an XSN tree 703. The structure of XSN trees is described further below in connection with FIGS. 12A and 12B. As part of the conversion process, GUIDs are created or retrieved from the Set Manager 402 and inserted into the XSN tree 703 for the corresponding sets. Control is then returned to the SQL Connector 601.

Because the example embodiment in this case requested a result set, a second call would then made to the XSN Interface 603 to realize any sets that are expected to be returned to the caller. The XSN tree 703 is then passed to the Optimizer 604 where the XSN tree 703 is optimized for efficiency, resulting in the optimized XSN tree 704 (shown here in expression format as opposed to tree format merely for illustrative purposes). Note that, in the example case, the optimizer merged the rdmRest into the rdmJoin for efficiency. The optimized XSN tree 704 is then passed to the Set Processor 605 where the collection of algebraic relations in the XSN tree is calculated. The realized sets are then returned to the caller.

Figure 8:
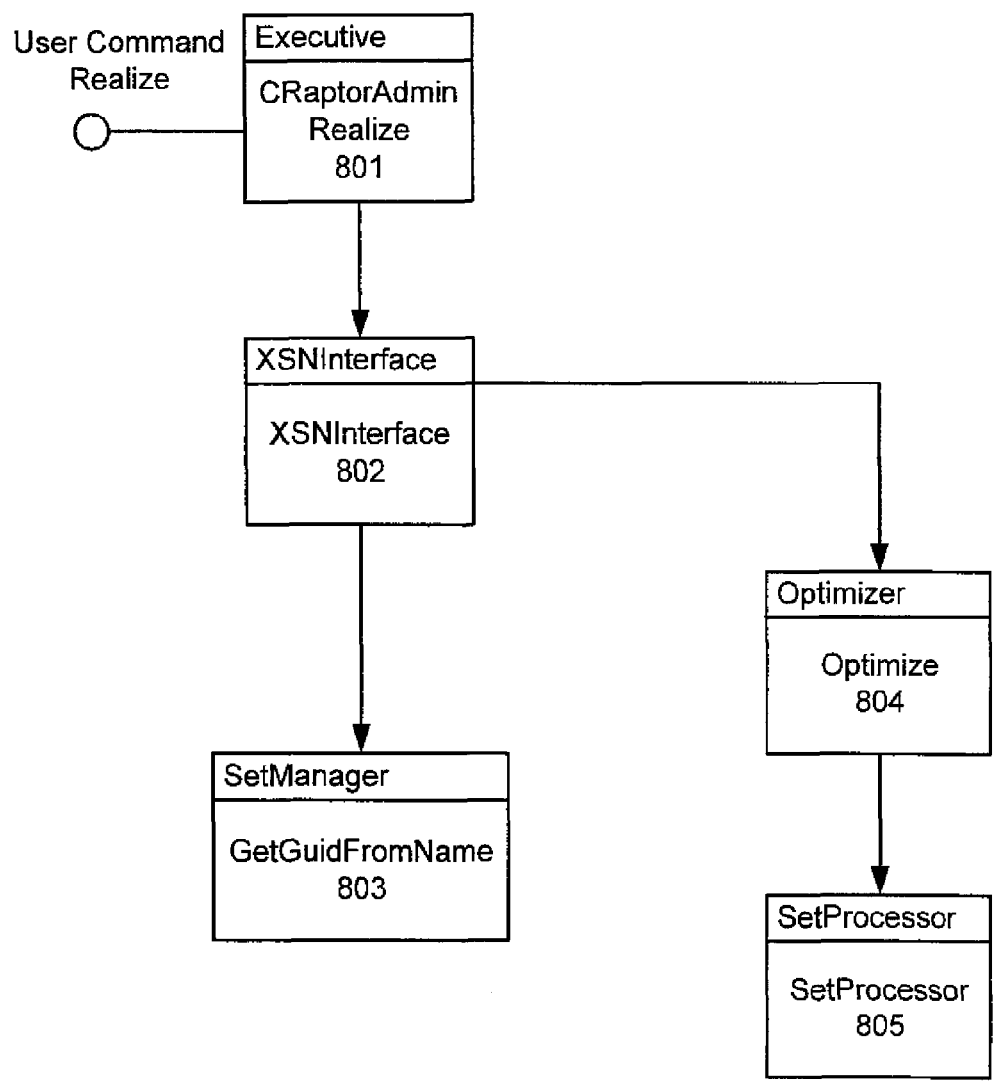
FIG. 8 is a flow chart of a method for realizing data sets according to an example embodiment of the present invention.

FIG. 8 is a block diagram illustrating one example embodiment of a software module implemented to facilitate set realization. Set realization is the process of calculating the membership of a set and realizing a physical representation of such set in storage. Set realization can be initiated from the system's external interfaces that support realization, such as the SQL Connector or the XML Connector, or from the Executive software module as part of a set export procedure. In this example embodiment, an export command is issued to the Executive 801. The command may identify an external identifier or a GUID to be exported, along with a storage path. The Executive 801 then passes the external identifier or the GUID to the XSN Interface 802. If an external identifier was identified in the command, the XSN Interface 802 passes the external identifier to the Set Manager 803. The Set Manager 803 determines the GUID associated with the external identifier and returns the GUID to the XSN Interface 802. This lookup is performed relative to the temporal values associated with the GUID. Unless otherwise specified by the user, the example embodiment uses the most recent GUID associated with the external identifier. Once the associated GUID is determined, the external identifier is replaced with the associated GUID. The GUID to be realized, whether specified directly in the command or obtained from the external identifier, is then passed to the Set Manager 803 to determine if it is realized. If the data set associated with the GUID is already realized, control is returned to the Executive 801. If the data set associated with the GUID is not realized, the GUID is then submitted to the Optimizer 804 to be realized. The Optimizer 804 then determines the optimal collection of algebraic relations representing the data set associated with the GUID. The collection of algebraic relations is then passed to the Set Processor 805 where it is calculated. Once the collection of algebraic relations is submitted to the Set Processor 805, control is returned to the Executive 801. The Executive 801 then requests that the Storage Manager provide the data from the data set to the Executive 801, which then saves the data to storage using the path name specified in the export command.

Figure 9A:
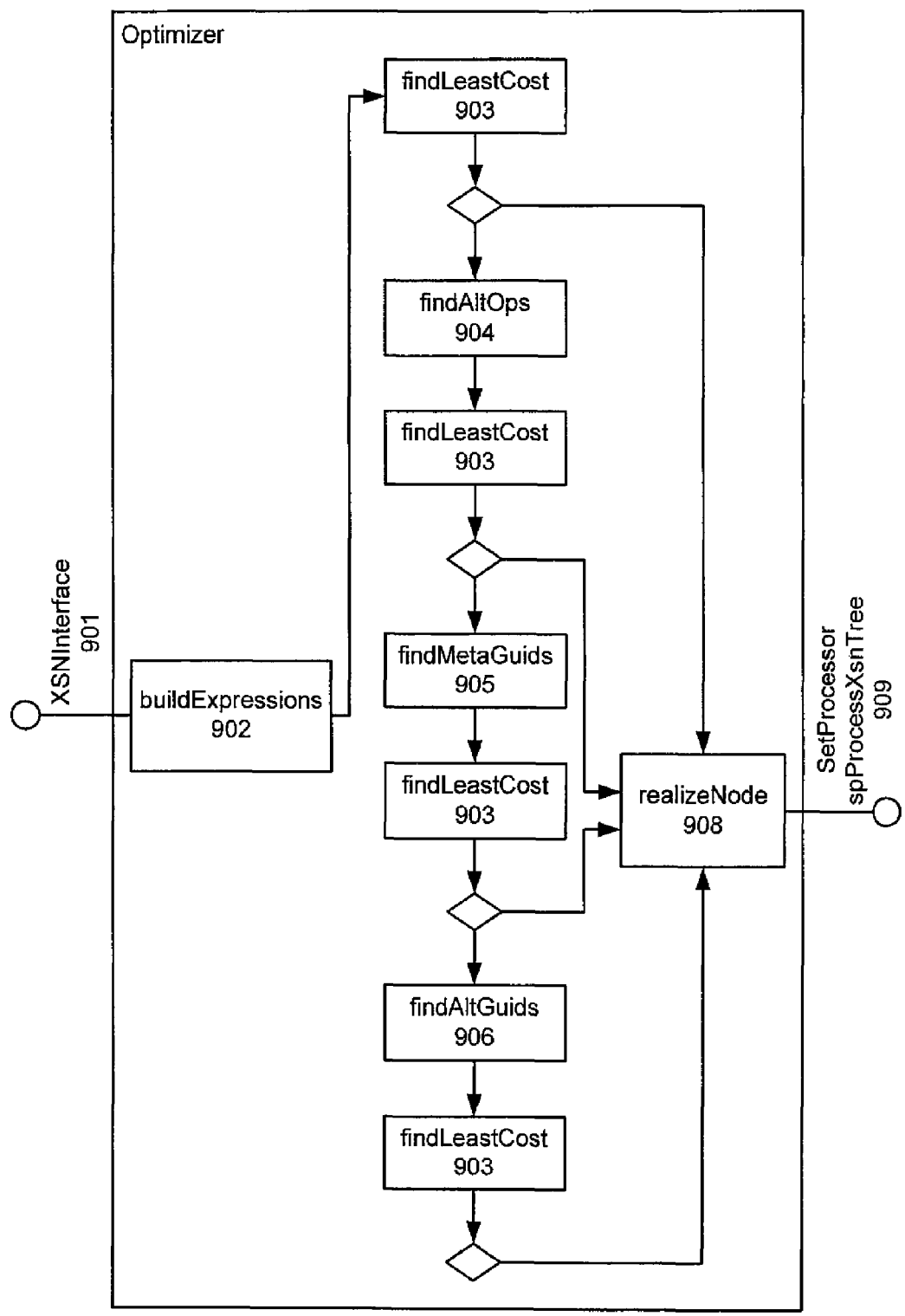
FIG. 9A is a flow chart of a method for algebraic and operational optimization according to an example embodiment of the present invention.

FIG. 9A is a block diagram illustrating an example embodiment of an algebraic and operational optimizer software module. The optimizer manipulates collections of algebraic relations to algebraically and operationally optimize them prior to submission to the Set Processor 909. There are numerous methods that could be used to determine which collections of algebraic relations are most efficient based on the system environment and the various limitations or performance weaknesses related thereto.

In the example embodiment in FIG. 9A, the optimizer operates with regard to two basic principles. First, no alternative plan to realize a data set has a lower cost than simply reusing a data set which has been previously realized. Second, the amount of data retrieved across the storage-boundary performance barrier should be minimized. Other principles may also be applied in other example embodiments, especially as the state of technology changes. The foregoing basic principles are realized in the example embodiment through three optimization routines, the findAltOps routine 904, the findMetaGuids routine 905, and the findAltGuids routine 906. It is important to note that other optimization routines could be used and there could be more or fewer optimization routines in a system. In the example embodiment, the optimization routines are performed in a specific sequence designed to attempt the optimizations that are more likely to result in a collection of algebraic relations with sufficiently low cost as quickly as possible.

The findLeastCost routine 903 is executed before the optimization routines are executed and after each optimization routine is executed, as further described below. The cost related to execution of a particular collection of algebraic relations is determined by estimating the time that it will take the system to retrieve the data sets necessary to calculate the collection of algebraic relations from storage. The estimated retrieval time may be calculated based on the speed in which information can be retrieved across each respective I/O storage barrier and the estimated amount of information required to be retrieved across such storage barrier. The cost determination could also take into account other factors, such as whether or not the information will be read across the same or different I/O channels and whether certain information is used in multiple subparts of the expression, both of which could affect performance. These optimization techniques may result in different optimizations depending upon the state of the system when the optimization routines are executed. For example, different data sets with the same logical data may be available in different data formats having different sizes. If they are available over the same I/O channel, the data set with the smaller format may be selected. However, the larger format may be selected if it has been recently accessed and is already available in a high speed memory or cache.

In the example embodiment, the XSN Interface 901 calls the optimizer software module in order to realize a set associated with a collection of algebraic relations. The XSN Interface 901 passes the GUID of the set to be realized to the buildExpressions routine 902 within the optimizer software module. The buildExpressions routine 902 retrieves one or more original algebraic relations that define the set or sets identified by the GUID from the Algebraic Cache. These algebraic relations may be referred to as genesis expressions. The buildExpressions routine 902 then builds an OptoNode tree representation of such genesis expressions. OptoNode trees are described in further detail below and can be used to represent an algebraic relation as a collection of more primitive algebraic relations. The optimizer software module then executes the findLeastCost routine 903 to determine the lowest cost genesis expression. If the findLeastCost routine 903 determines that the genesis expression found to be lowest cost is sufficiently inexpensive to execute, further optimization is aborted and the algebraic relation for such genesis expression is submitted to the realizeNode routine 908 as described below.

If the findLeastCost routine 903 determines that the genesis expression found to be the lowest cost is not sufficiently inexpensive to execute, the findAltOps routine 904 is executed to find alternative operations. This routine synthesizes alternative versions of the genesis expressions using extended set theory algebra. The synthesized alternative expressions are constructed to be potentially less costly to execute, as well as to be easily identified in the Algebraic Cache. Expression synthesis is done based on the recognition of "forms" of expressions and the substitution of other forms that are algebraically equivalent but less costly to compute and/or more likely to be recognized in the Algebraic Cache. A simple example is a restriction on two joined sets. Using some notational shorthand, this could be expressed as SETA=R(J(a,b,c),d). However, the join operation is also capable of doing restrictions and an equivalent expression is SETA=J(a,b,CP(c,d)). Both of these forms require the same amount of input data to compute, however the second form will generate less output data. This means that the second form will require less computational and I/O resources. Whether or not the second form is preferable over the first will depend on what is available from the Algebraic Cache and which sets are already realized in persistent storage. However, exploring both forms in the Optimizer 418 allows for a larger probability of finding more efficient alternatives.

If the findAltOps routine 904 indicates that alternative expressions were found, then the findLeastCost routine 903 is executed again to find the least-costly expression based on the least cost genesis expression and the alternative expressions. Once again, if the findLeastCost routine 903 determines that the expression found to be lowest cost is sufficiently inexpensive to execute, further optimization is aborted and such expression is submitted to the realizeNode routine 908 as described below. The threshold for discontinuing optimization may be determined based on the relative speed of the processing resources and data channels and/or other system characteristics. In one example, the threshold is set to 10 MB of data transfer. In this example, 10 MB of data can typically be transferred in about one tenth of a second, so further optimization is abandoned and the set is simply calculated from the expression.

If neither the genesis expressions nor their alternatives identified by the findAltOps routine 904 were sufficiently inexpensive to execute, as determined by execution of the findLeastCost routine 903, then the next optimization routine is performed. In the example embodiment, the next optimization routine is the findMetaGuids routine 905. The findMetaGuids routine 905 locates all expressions that have an incrementally small cost and submits them to the Set Processor for execution. Expressions with an incrementally small cost often only contain metadata. Examples of low cost operations include predicate cross products (CP operation), output scope transforms (OST operation), and relational data model sort domain for left and right (rdmSFL and rdmSFR operations). These operations typically operate on metadata in the user data model and produce additional metadata. Physical set sizes are typically under 500 bytes or so, making them prime candidates for rapid calculation far below the execution threshold of the Optimizer 418. Therefore, rather than test if these operations meet the minimum threshold, they may simply be executed immediately from the Optimizer 418. The findLeastCost routine 903 is then called again to select the least-costly expression as between the least expensive expression determined from the previous call to the findLeastCost routine 903 and the expressions resulting from the findMetaGuids routine 905. Once again, if the findLeastCost routine 903 determines that the expression found to be lowest cost is sufficiently inexpensive to execute, further optimization is aborted and such expression is submitted to the realizeNode routine 908 as described below.

If the lowest cost expression identified by the findLeastCost routine 903 is still not sufficiently inexpensive to execute, then the findAltGuid routine 906 is executed. The findAltGuids routine 906 determines if one or more subexpressions can be replaced by alternative expressions that describe previously realized sets. As the cost of reusing realized sets is always less than the cost of executing the expressions required to realize such sets, this routine may be used to provide a further reduction in cost. One example of a subset substitution may be described using the relational data model. Assume that a particular field (called SIZE and the third field of the table) in a table (called BOXES) has values ranging from 0 to 100. A user then issues a query (Q1) asking for all boxes of size less than 50. This is expressed in XSN as Q1=rdmREST(BOXES, {{{"LT".<"3","CONST". "50">}}}). Some time later, a user asks for all boxes less than 25 in size. This is submitted as Q2=rdmREST(BOXES, {{{"LT".<"3","CONST"."25">}}}). In both of these queries, if executed as submitted, the entire BOXES data set must be read to determine the results Q1 and Q2. However, mathematical inspection of the metadata sets {{{"LT".<"3", "CONST"."50">}}} and {{{"LT".<"3","CONST". "25">}}} indicates that any set restricted by the second is a subset of the first. Therefore an algebraic substitution can be made and the following expression produced: Q2=rdmREST (Q1, {{{"LT".<"3","CONST"."25">}}}). If Q1 has already been realized in persistent storage, it can be shown that the size of Q1 must be less than the size of BOXES, and therefore require less I/O cost to transfer. This then provides an overall less costly means for evaluation Q2 than the original submitted expression if Q1 is already realized.

After the subexpressions have been replaced by any suitable alternative expressions, the findLeastCost routine 903 is executed again to select the least-costly expression as between the least expensive expression determined from the previous execution of the findLeastCost routine 903 and the expressions resulting from the findAltGuids routine 906. If the findLeastCost routine 903 determines that the expression found to be lowest cost is sufficiently inexpensive to execute, further optimization is aborted and such expression is submitted to the realizeNode routine 908 as described below.

After the optimization work described above is complete, the optimizer calls the realizeNode routine 908. The realizeNode routine 908 converts the OptoNode tree to an XSN tree, calls the spProcessXsnTree routine to submit the XSN tree to the Set Processor 909 for execution, deletes the XSN tree and returns control to the optimizer software module, which then returns to the XSN Interface 901.

Figure 9B:
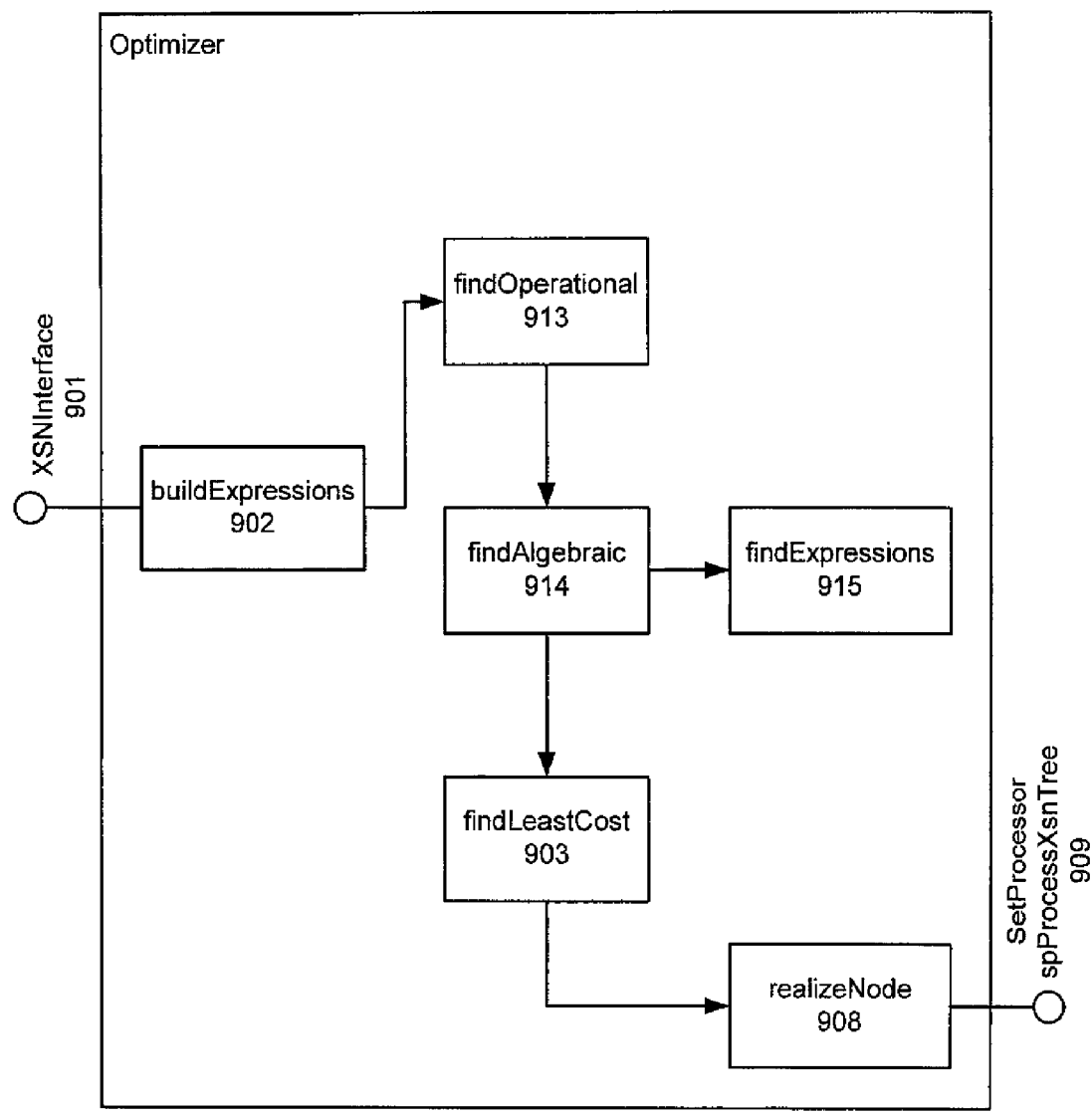
FIG. 9B is a flow chart of a method for algebraic and operational optimization according to an alternate example embodiment of the present invention.

FIG. 9B is a block diagram illustrating another example embodiment of an algebraic and operational optimizer software module. Unlike the example embodiment presented in FIG. 9A, the optimization routines in this example embodiment are applied to each OptoNode tree proceeding from the leaves to the root. This approach provides the results of each of the optimization routines as the arguments to the expressions, resulting in further chances for optimization, but at the expense of increased execution time. Under conditions where significant additional optimizations can be made, this approach may be preferable.

The implementation in the example embodiment uses only two optimization routines, the findOperational routine 913 and the findAlgebraic routine 914. Unlike the previous example embodiment, the findLeastCost routine 903 is executed only after both findOperational routine 913 and findAlgebraic routine 914 have been performed. The functionality of the findLeastCost routine 903 is the same as that described in the previous example embodiment.

As in the previous embodiment, the XSN Interface 901 calls the optimizer software module and passes the GUID of the set to be realized to the buildExpressions routine 902. The buildExpressions routine 902 is the same as that described in the previous example embodiment. After the buildExpressions routine 902 has constructed the OptoNode tree for the expression, the findOperational routine 913 is executed to find alternative operations. This routine performs the identical function to findAltOps routine 904 as described in the previous example embodiment.

After the find Operational routine 913 completes, the modified OptoNode tree is passed to the findAlgebraic routine 914 to find additional alternative expressions. The findAlgebraic routine 914 iterates over the OptoNode tree from the right to left and innermost to outermost expression. This order of iteration results in the maximum potential for finding additional alternative expressions. As each expression contains one operation and between one and three arguments, each combination of arguments and the operation are presented one at a time to the findExpressions routine 915. The findExpressions routine 915 then executes code specific to the operation of the expression with the intention of finding or synthesizing alternative expressions. The code specific to the operation may perform algebraic substitutions of arguments from the Algebraic Cache, perform calculation of low cost expressions contained within the expression, calculate the expression itself, and synthesize alternative forms of the expression or any of the expression's arguments. Any alternative expressions are then added by the code specific to the operation to the OptoNode tree at the appropriate location.

After the optimization work described above is complete, the Optimizer calls the realizeNode routine 908, which is the same as the realizeNode routine in the previous example embodiment. Control then returns to the XSN Interface 901.

The system may also perform comprehensive optimization. Comprehensive optimization analyzes relations and data sets to add new relations to the Algebraic Cache and sets to the Set Universe that are expected to be useful in optimizing the evaluation of future requests. This may be performed based on the pattern of past requests to the system, which can be used to perform optimization in anticipation of similar requests in the future. This comprehensive optimization may be performed in the background by using spare processor cycles. FIGS. 9C, 9D, 9E, 9F, 9G and 9H illustrate example methods of comprehensive optimization. However, a variety of other comprehensive optimizations are possible and these example embodiments are only a few examples within the present invention.

Figure 9C:
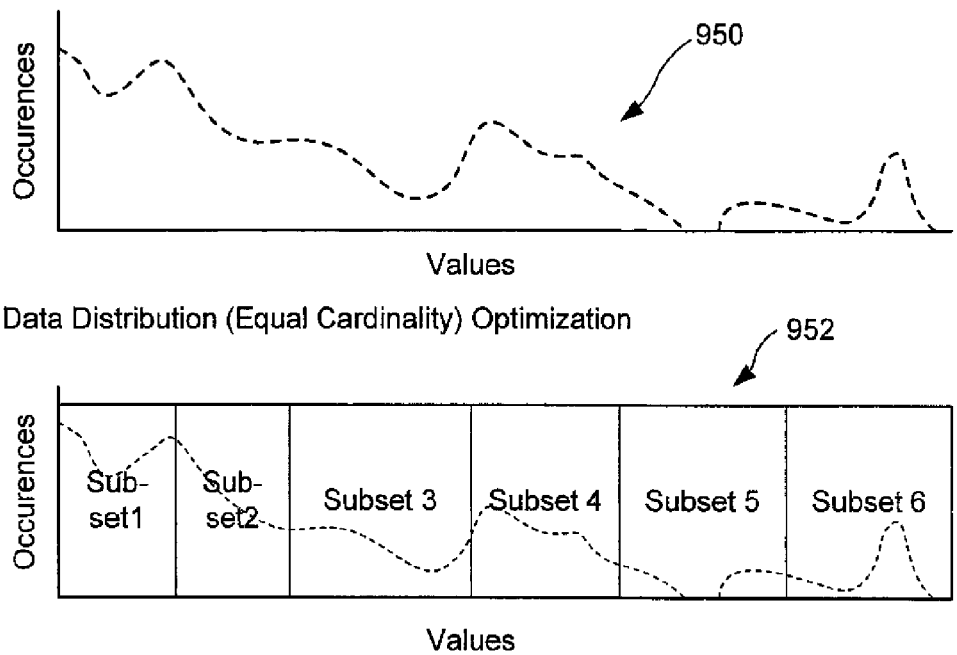
FIGS. 9C, 9D, 9E, 9F, 9G and 9H illustrate methods for comprehensive optimization according to example embodiments of the present invention.

FIG. 9C illustrates an example in which an individual scalar value or open ended range of scalar values identifies the membership of a subset. Queries of this nature can benefit from creating subsets that partition the data into sets of equal cardinality where each subset contains a specific range of values. For example, a data set may have a data distribution as shown at 950 in FIG. 9C. This data set may be partitioned into multiple data sets of equal cardinality, such as subsets 1-6 as shown at 950 in FIG. 9C. An example of this would be asking for all transactions that occurred after or before a certain date. This optimization has the advantage of reducing the amount of data that the Set Processor must examine to calculate future subsets of a similar nature. The comprehensive optimization routine would identify this situation by detecting a significant number of relational restrictions against a specific set using a range of scalar values by inspection of the Algebraic Cache. From these entries, the Optimizer would determine the maximum and minimum scalar values queried to establish the range of scalar values to be partitioned. The Optimizer would then determine the number of partitioning subsets to be equal to the average number of available I/O channels. Finally, the Optimizer would insert the appropriate relations into the Algebraic Cache and sets into the Set Universe for each of the partitioning subsets. The Optimizer may also insert a relation indicating that the union of the subsets equaled the set and invoke the Set Processor to calculate each of the partitioning subsets.

Figure 9D:
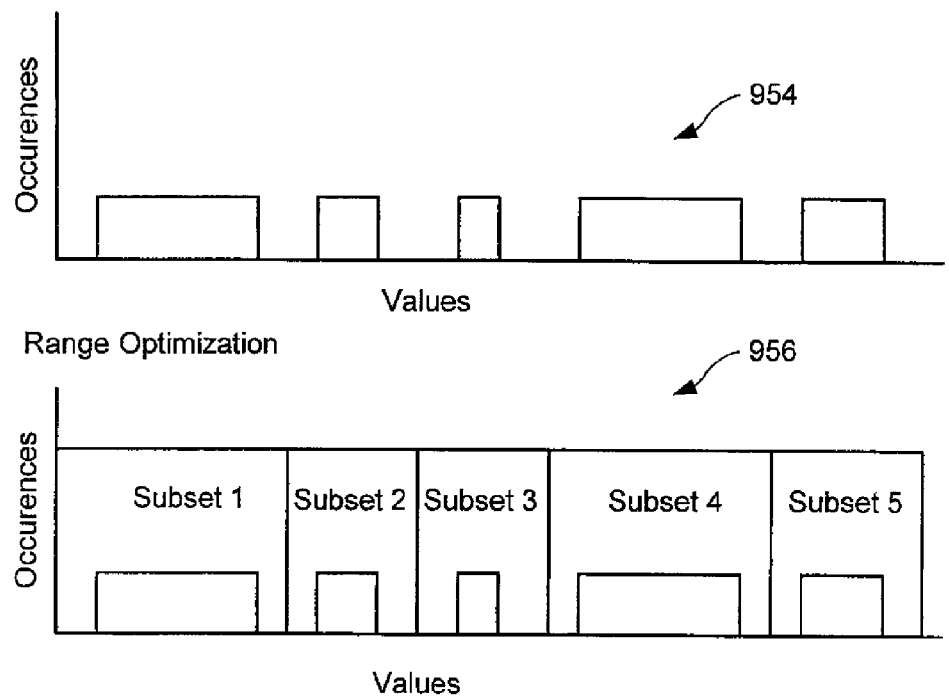

FIG. 9D illustrates an example comprehensive optimization that is similar to the optimization in FIG. 9C, except the criteria for membership in the portioning subsets is based on the scalar values falling within specific ranges. An example of this would be determining that desired subsets are for given ranges of customers' ages. For example, the data in a data set may fall within specific ranges as shown at 954 in FIG. 9D. This data set may be partitioned into subsets 1-5 encompassing each of these ranges, as shown at 956 in FIG. 9D. As with the other example comprehensive optimizations, this type of partitioning allows for less data to be examined by the Set Processor, resulting in an improvement via the reduction of the calculation time and resources required.

Figure 9E:
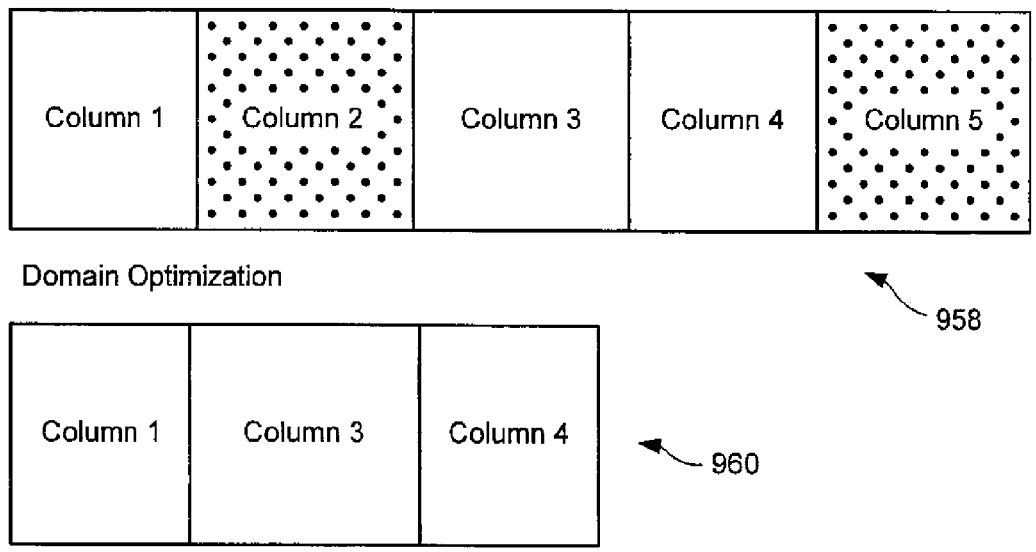

FIG. 9E illustrates another form of comprehensive optimization, but this example optimization is based on the domains of the members of a set instead of the scalar values. In this example, the Optimizer determines that only certain domains are required to produce useful subsets and that other domains are not required. For example, the data set 958 in FIG. 9E has columns 1-5, but the Optimizer may determine that many requests only require columns 1, 3 and 4 to be used. The Optimizer would then make entries in the Set Manager to generate a subset with members containing only the domains of interest and invoke the Set Processor to generate this subset. For example, a data set may be created with only columns 1, 3 and 4 as shown at 960 in FIG. 9E.

Figure 9F:
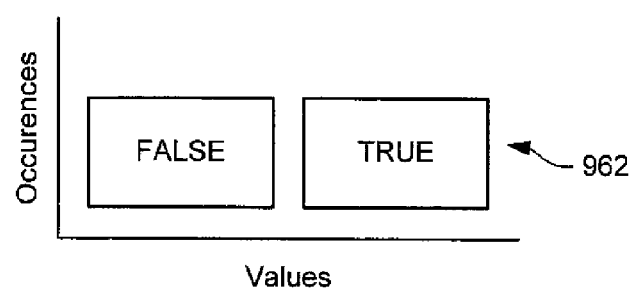
Figure 9F:
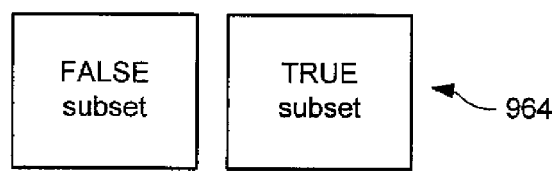

FIG. 9F illustrates an example in which it is determined that the scalar value of a domain of interest has relatively low cardinality. An example would be a binary domain having the scalar values TRUE and FALSE as shown at 962. The Optimizer would then create relations for subsets where this domain was monotonic for each value present in the domain while eliminating the domain from the resultant subset. For example, as shown at 964, a subset could be created for all members of the original data set where the value of the domain is FALSE and a separate subset could be created for all members where the value of the domain is TRUE. This optimization can have significant performance benefits, as even a binary field offers an average improvement in performance of one hundred percent.

Figure 9G:
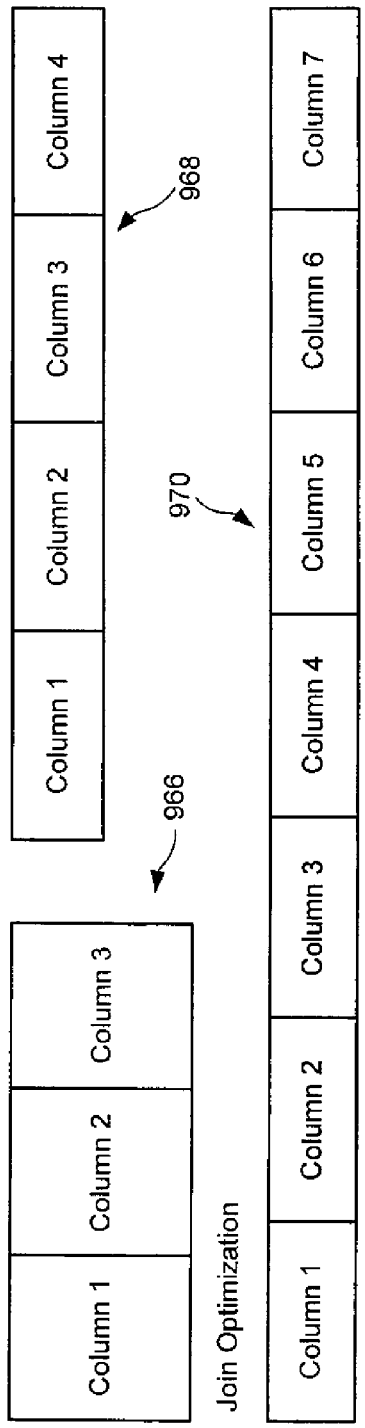

FIG. 9G illustrates an example in which a set is comprised of the relational join of two sets. In conditions where the join results in a data set where the cost is equal to or less than the original two sets, the Optimizer would perform the join. An example of this would be a relational inner join where primary and foreign keys exist that do not correspond between the relational sets. For example, a first data set 966 may include three columns (shown as columns 1, 2 and 3 of data set 966 in FIG. 9G) and a second data set 968 may include four columns (shown as columns 1, 2, 3 and 4 of data set 968 in FIG. 9G). These two data sets may be joined to create a third data set 970 with seven columns (shown as columns 1, 2, 3, 4, 5, 6, and 7 of data set 970 in FIG. 9G)

Figure 9H:
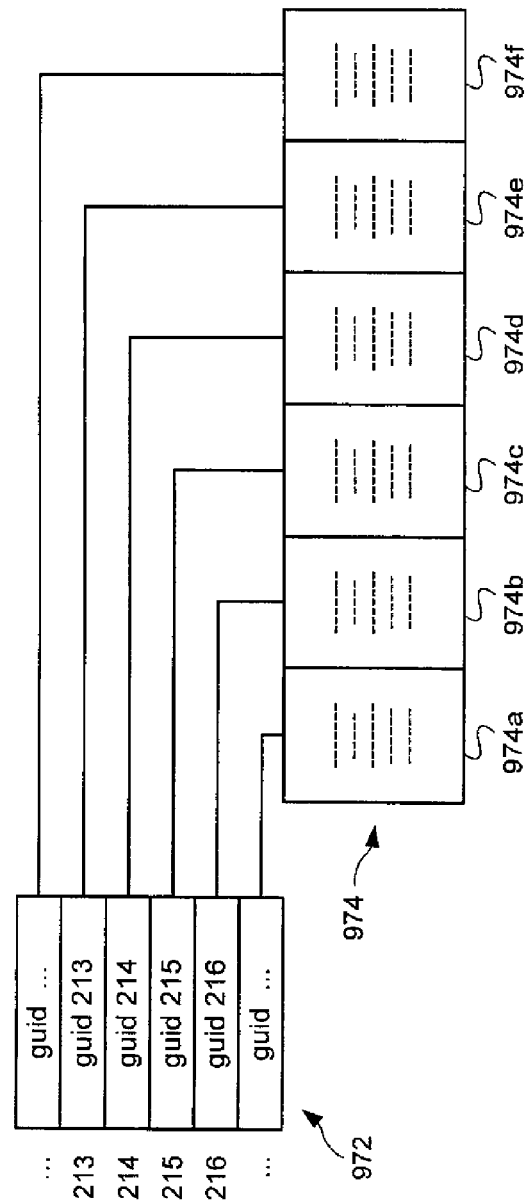

FIG. 9H illustrates an example of vectored multipaging. If users often access information in a particular way (e.g., a phone number is used to look up name and address information about a person), the Optimizer may automatically define new data sets and add new relations to the Algebraic Cache to make these requests more efficient (e.g., defining a data set that includes only phone number, name and address) by creating vectored multipages. For example, the Optimizer may determine that the three digit area code, three digit prefix and four digit postfix components of a phone number are to be used for vectored multipaging. The Optimizer would then create a set 972 containing 1,000 subsets 974 for each of the 1,000 possible area codes (000-999). Each of these subsets would contain 1,000 GUIDs referencing subsets for each of the possible prefix values (000-999) and each of these subsets would contain 10,000 members with the name and address information about a person for each four digit postfix. Fully populated, this could create 100,000 subsets based on the area code and phone number prefix. However, since many area code and prefix combinations would not be in use, these entries would simply refer to the NULL set. Once these sets were created, the Set Processor can make use of them to quickly locate an individual person based on their phone number by simply using the area code as an offset (vector) into the area code set, retrieving the GUID representing the appropriate prefix subset, then using the prefix as an offset to determine the GUID of the appropriate postfix subset. Finally, the phone number postfix would be used as an offset to locate the data for the individual person.

Figure 10A:
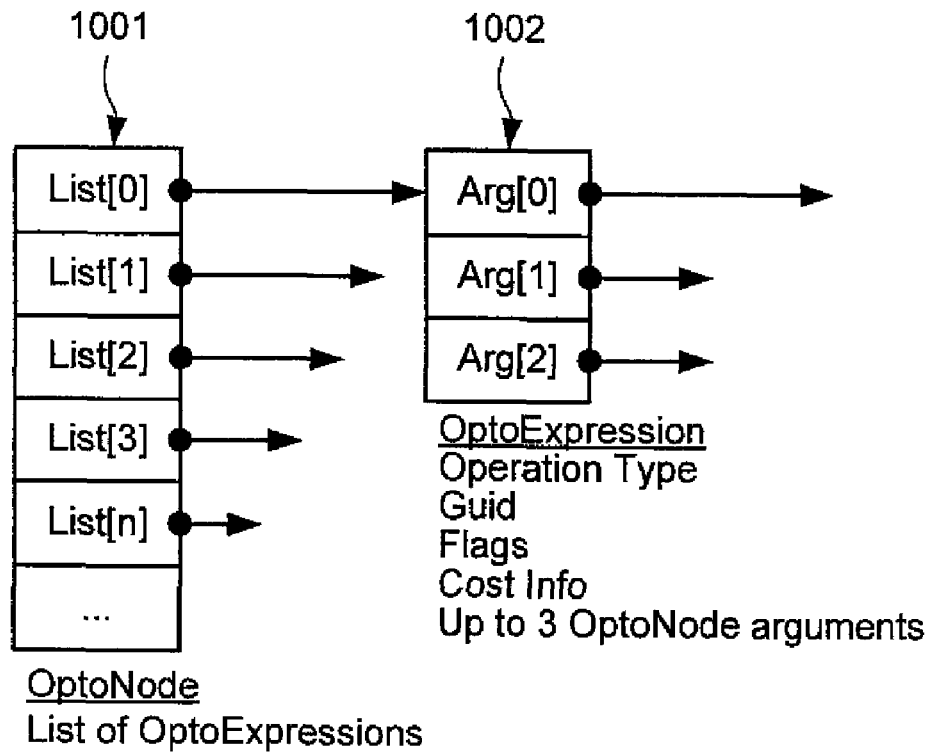
FIG. 10A illustrates the fields of an example OptoNode structure.

FIG. 10A is an illustration of an OptoNode tree structure. OptoNode trees are used to keep track of the relations, expressions and arguments being manipulated by the Optimizer. At the root of the tree is an OptoNode 1001, which is a list of a plurality of OptoExpressions 1002. Each OptoExpression 1002 in the list contains information related to a mathematically equivalent variation of the other expressions in the same list. Specifically, in the example embodiment, each OptoExpression 1002 contains an operation type, a GUID identifying the expression, various flags (these Boolean flags indicate if the OptoExpression has a GUID, if the expression it represents is in the Algebraic Cache, and if the OptoExpression is used as part of an alternative expression for the GUID), cost information (a value indicating the cost to be used in evaluating the cost of this OptoExpression and a value indicating the cost of the expression if it is realized independently of the rest of the expression it is contained in), and up to three OptoNode arguments. The Optimizer creates one or more OptoExpressions 1002 in order to determine the most efficient method for evaluating the desired expression. As described above, the Optimizer analyzes each OptoExpression 1002 and determines the cost associated with evaluating the expression. The Optimizer can then determine which OptoExpression 1002 to use for efficiency.

Figure 10B:
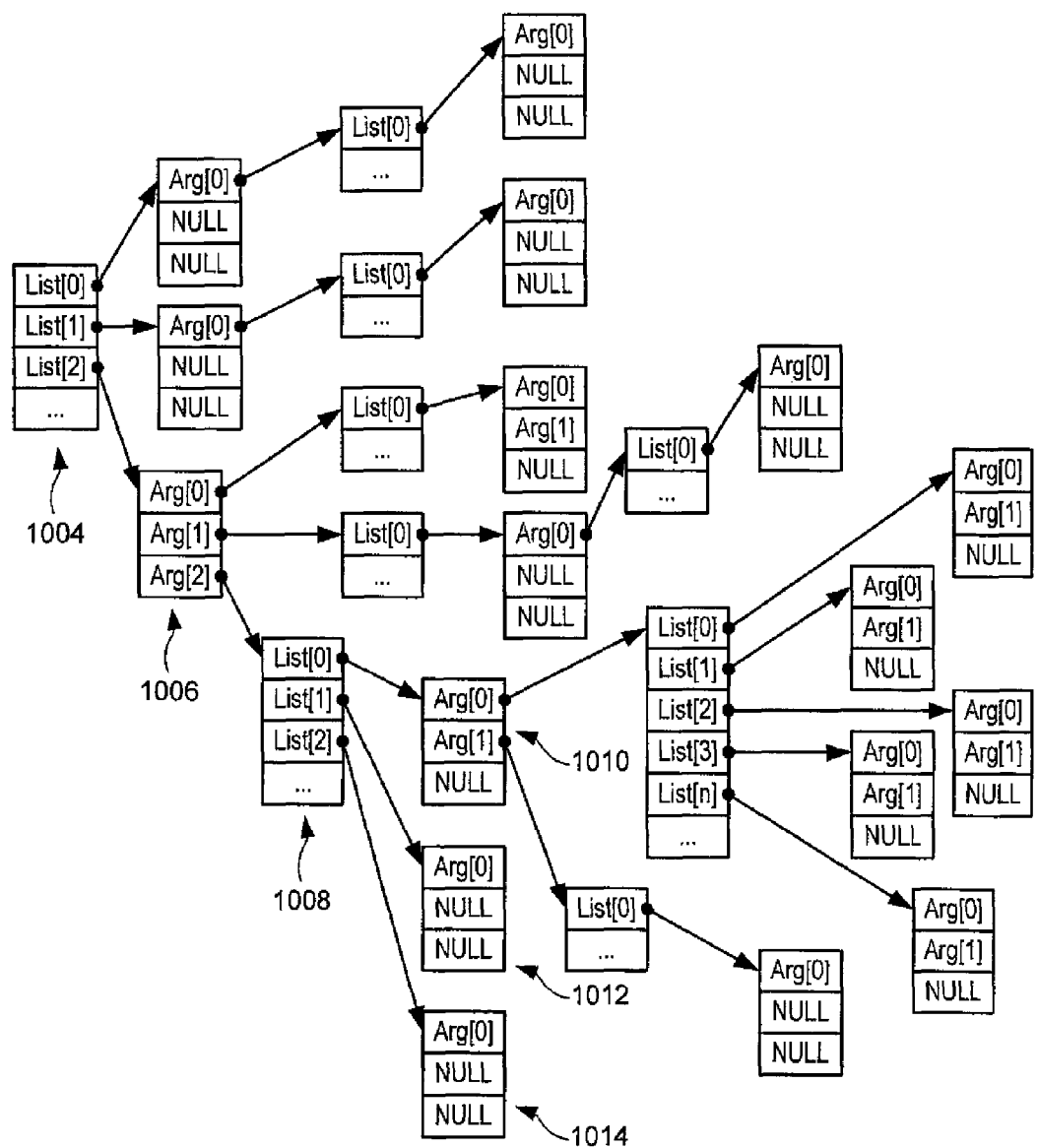
FIG. 10B is a block diagram of an example OptoNode structure according to an example embodiment of the present invention.

FIG. 10B illustrates an example OptoNode tree. At the root of the tree is OptoNode 1004 which is a list of OptoExpressions representing mathematically equivalent expressions. Each OptoExpression includes a list of the arguments for the expression. For instance, OptoExpression 1006 includes three arguments Arg[0], Arg[1] and Arg[2]. Each argument may, in turn, reference an OptoNode that lists alternative expressions that may be used for the particular argument. For instance, OptoNode 1008 references a list of expressions (List[0], List[1], List[2], . . . ) that may be used for Arg[2] of OptoExpression 1006. These expressions, in turn, are represented by OptoExpressions 1010, 1012 and 1014. Each of these expressions provides a mathematically equivalent result when used for the argument Arg[2] of the expression represented by OptoNode 1006. This OptoNode tree structure allows multiple equivalent expressions to be listed at each level of the tree. For example, the findAlgebraic routine 914 in the Optimizer (shown in FIG. 9B) can iterate over the OptoNode tree to find additional alternative expressions and add them to the OptoNode tree. The findLeastCost routine 915 can then traverse the OptoNode tree to identify the particular collection of expressions that can be used to calculate the overall result with the least cost. The selected collection of expressions can then be converted into an XSN tree and sent to the Set Processor for calculation.

The Set Processor is responsible for all calculations and logical value comparisons performed by the system on data sets. In one example embodiment, it may be a multithreaded, reentrant body of software designed to take advantage of systems containing multiple processors and multiple independent, non-contending I/O channels between system memory and persistent storage. The Set Processor may also be designed to take advantage of data pipelining between operations. That is, the result of one operation may be directly passed on as the input of the next without such result being written to persistent storage intermediately. Data pipelining can greatly improve the efficiency of the Set Processor by reducing the amount of data crossing the I/O performance barrier, as well as reducing the burden on the Storage Manager, which is responsible for obtaining data from persistent storage.

The execution of the various operations is monitored by an object known as the Thread Pool. The Thread Pool is responsible for launching the execution threads for each operation as requested by the ProcessOp routine, monitoring their execution and reporting their success or failure. The Thread Pool also works with the Executive to limit the current number of threads executing within the engine as required to manage system resources. Threads could be implemented with a number of different hardware and software platforms. For example, a traditional single-core processor such as processor 102 in FIG. 1 could be used with an operating system such as Microsoft Windows®, which simulates multi-processing. In an alternative embodiment, multiple processors or multi-core processors could be used with one or more threads being assigned to each of the processors. In another embodiment, a multiprocessor system as illustrated in FIG. 3 could be used, with a thread of execution assigned to each MAP 306 *a-f*. Regardless of the physical implementation of the system, the Set Processor in an example embodiment may chain together operations using lists, tree, or other structures such that the output from one thread becomes the input of another thread in order to increase performance.

The operations within the Set Processor are individual routines designed to perform a calculation on one or more input data sets and produce an output data set. These operations are equivalent to the extended set operations and functions found to be useful in data processing. The Set Processor may also have multiple implementations of the algorithms for each operation in order to support a wide variety of physical to logical format mappings. By tailoring the operational routine to the physical data formats, higher efficiencies and performance can be achieved over converting all data into a single physical representation for processing. One example embodiment supports logical to physical mappings between different formats such that, for example, data can be mapped between comma separated value (CSV) format, binary-string encoding (BSTR) format, fixed-offset (FIXED) format, type-encoded data (TED) format, and/or markup language format. This allows the data to be processed by the system without having to convert all of the data into a common format. For example, if the system needs to calculate the result of a join between a first data set in CSV format and a second data set in XML format, the system could use its mappings to calculate the result and return such result in either CSV format, XML format, or another selected format without having to convert any of the data into another format. In addition, one example embodiment contains a number of logical to physical mappings for atomic values as well, such as strings, 32-bit integers, 64-bit integers, floating point numbers, currencies, Boolean values, datetime values, and interval values. These mappings can be used in a similar way as the data format mappings. A system may contain all of the potential mappings for the various data formats and atomic formats supported, or only selected mappings can be included. For example, if an example embodiment supported five data formats, then there are five inputs and five outputs for each mapping routine, resulting in 125 potential versions of the software routines. In the example embodiment, software routines for mapping between various formats are only included when there is a material increase in efficiency. If no material efficiency would result, the example embodiment would convert the data into a common format instead of using a mapping function.

Another function of the Set Processor is to provide instances of object oriented data models of common sets schemas used throughout the program. This includes predicate sets, domain sets, cardinality sets and others that meet certain definitions and are useful constructs within the algebraic and calculation processing performed by the program.

Figure 11:
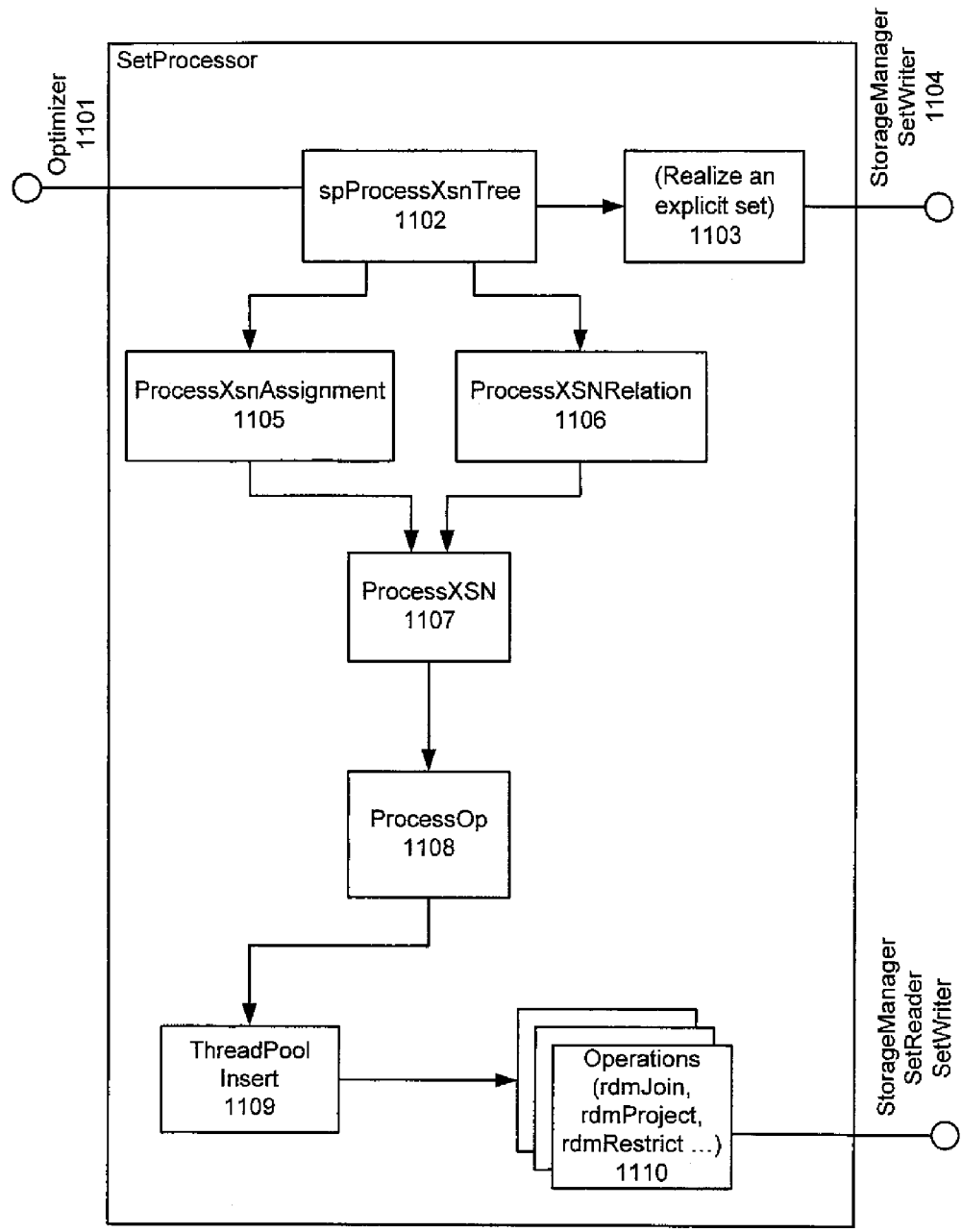
FIG. 11 is a flow chart of a method for calculating data sets from algebraic relations according to an example embodiment of the present invention.

FIG. 11 illustrates an example embodiment of the set processor software module. In the example, the Optimizer is presenting an XSN tree to the Set Processor for evaluation through the spProcessXsnTree routine 1102. The spProcessXsnTree routine 1102 examines the XSN tree and determines if the XSN tree represents an assignment or relational statement, or if the XSN tree represents an explicit set.

In the case of an assignment statement, the ProcessXsnAssignment routine 1105 examines the statement to determine if the left value (lvalue) of the statement is confirmed to be an XSN set. If the lvalue is not a set, the routine returns a failure code. The right value (rvalue) is then examined to determine if it is an operation or an explicit set. If the rvalue is an explicit set, the external identifier associated with the lvalue is associated with the GUID of the rvalue. If the rvalue is neither an operation nor an explicit set, the routine returns a failure code. If the rvalue is an operation, the ProcessXSN routine 1107 is called to continue the processing.

In the case of a relation statement, the ProcessXSNRelation routine 1106 checks to verify that the lvalue and rvalue are operations. If either or both are operations, the ProcessXSN routine 1106 is called to continue the processing for either or both. If the lvalue or rvalue are not operations, they are simply ignored. The purpose of this is to realize any set that is referenced in a relation statement so that the relation can be evaluated, typically, but not limited to, supporting the optimizer.

In the case of a request to realize an explicit set, the spProcessXsnTree routine 1102 immediately realizes the set in routine 1103 and returns a GUID identifying the realized set.

The ProcessXSN routine 1107 examines all of the members of the XSN tree, starting with the current operation at the root of the XSN tree and recursively calls itself for all operations. Each operation to be executed is passed to the ProcessOp routine 1108 in an order such that the root operations of the XSN tree are initiated before the lower operations, to ensure proper data pipelining is established.

The ProcessOp routine 1108 takes each operation and inserts it into the Thread Pool 1109 with the appropriate GUIDs for all sets associated with the operation to be performed. The Thread Pool 1109 then launches individual threads of execution for each operation within the statement presented to the ProcessXSN routine 1107. These threads of execution then run independently by calling the appropriate operation 1110 until the operation completes. Upon the completion of each of these threads, the Thread Pool 1109 is notified of the thread's completion and provides the appropriate clean-up and error handling, which includes removing the thread from the list of active threads.

The Set Processor also contains functions known as spLogical routines, which are designed to perform logical operations on sets. These logical operations are fundamentally different than the calculation operations performed by the spProcessXsnTree routine 1102 of the Set Processor. The spLogical routines, which include spLogicalEqual, spLogicalPrediateEqual and spLogicalPredicateSubSet are designed to compare two data sets, typically stored in binary XSN notation, and determine their logical relationship to each other. These relationships include equality, subset, superset and disjoint. These functions are used by the Optimizer in determining alternative expressions.

Figure 12A:
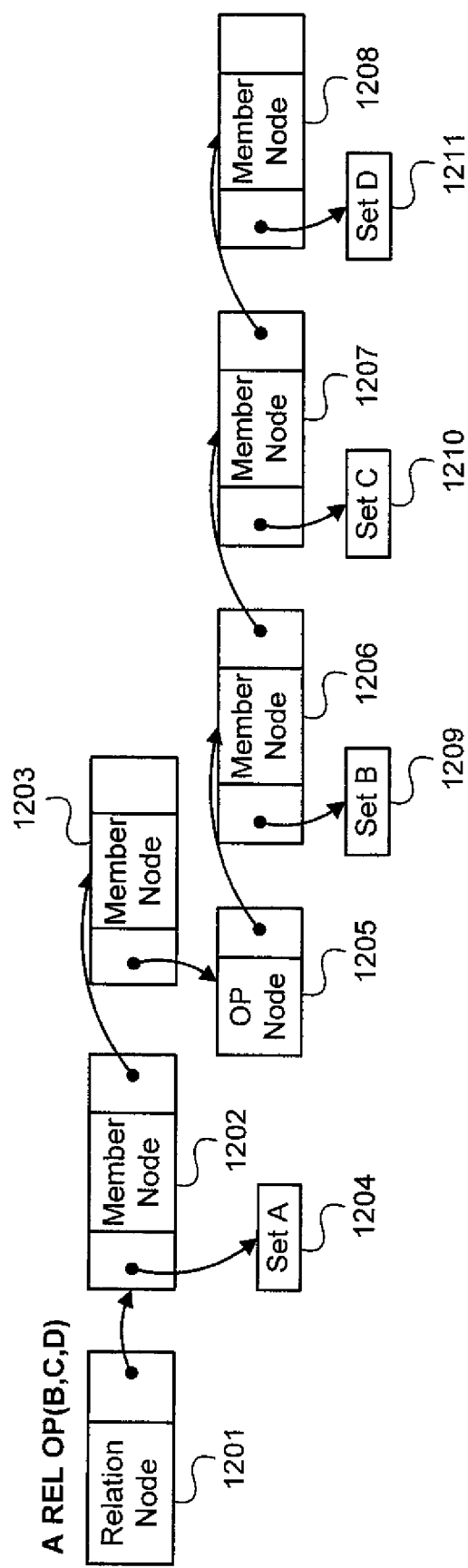
FIGS. 12A and 12B are block diagrams of example XSN trees according to an example embodiment of the present invention.

FIG. 12A is an illustration of an XSN tree structure that can be used to represent an example XSN expression in the system. The XSN tree provides a convenient format for processing XSN expressions in the system. FIG. 12A illustrates an XSN tree for the expression A REL OP(B,C,D). This expression relates the data set A by a relation (REL) to an operation (OP) performed on data sets B, C and D. The XSN tree is a doubly-linked list that is comprised of a relation node 1201, an operation node 1205, a plurality of member nodes 1202, 1203, 1206, 1207 and 1208, and a plurality of data sets 1204, 1209, 1210 and 1211. The relation node 1201 specifies the relation of the expression, such as equals, less than, greater than, etc. The relation node 1201 is linked to member node 1202, which has as its left child a link to data set A 1204 (which is the left value of the statement) and as its right child a link to member node 1203. Member node 1203 is linked to the operation node 1205 as its left child. The operation node 1205 identifies the operation to be performed, such as projection, restriction, join, etc. The operation node 1205 is linked to member node 1206, which has as its left child a link to data set B 1209 and as its right child a link to another member node 1207. Member node 1207 has as its left child a link to data set C 1210 and as its right child member node 1208. Member node 1208 is linked to data set D 1211.

Figure 12B:
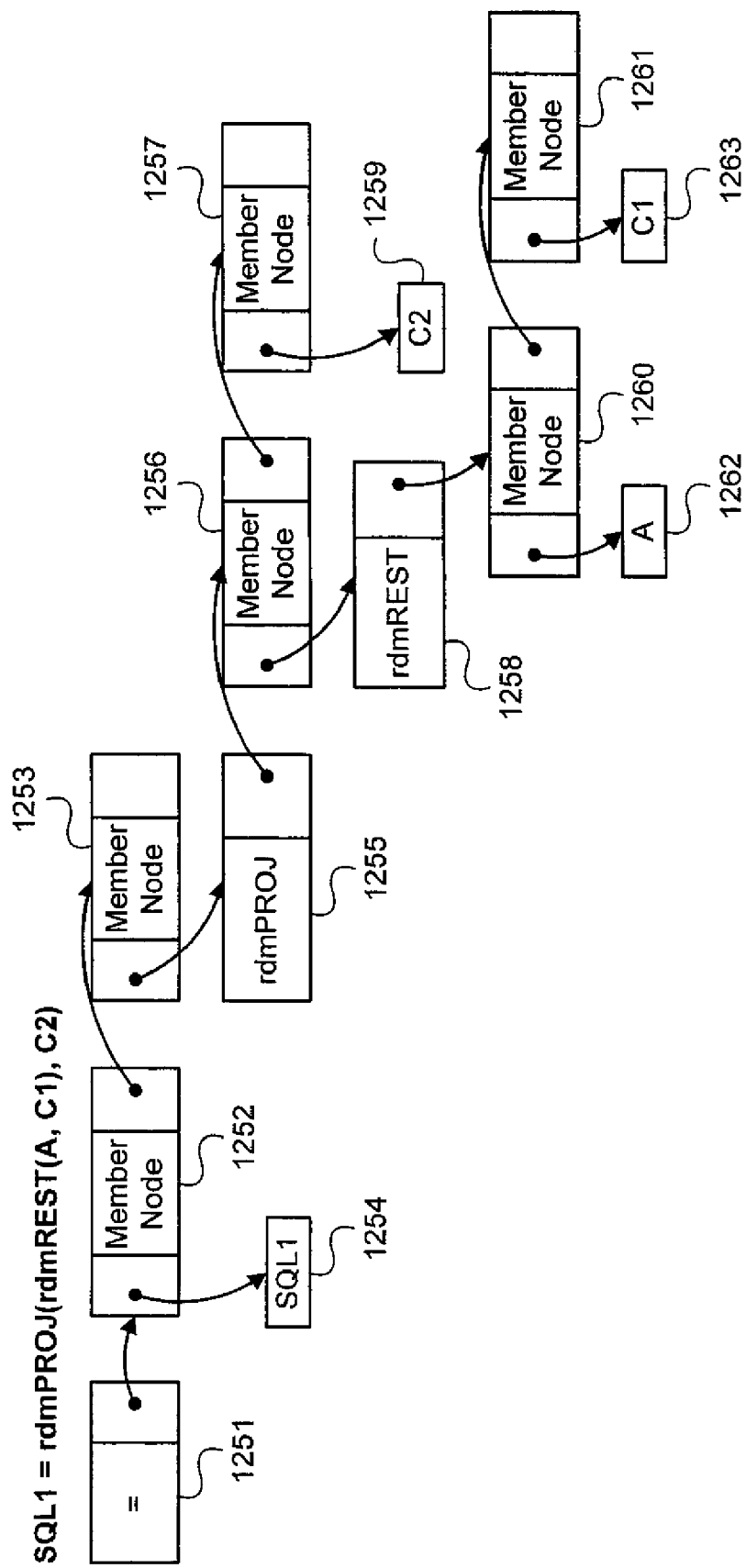

FIG. 12B is an illustration of an XSN tree structure that can be used to represent an example XSN assignment statement in the system. FIG. 12B illustrates an XSN tree for the assignment statement SQL1=rdmPROJ(rdmREST(A, C1), C2). This statement assigns the alphanumeric identifier SQL1 to the expression rdmPROJ(rdmREST(A, C1), C2). The XSN tree is a doubly-linked list that is comprised of an assignment node 1251, an alphanumeric identifier 1254, a plurality of member nodes 1252, 1253, 1256, 1257, 1260 and 1261, operation nodes 1255 and 1258 and a plurality of data sets 1259, 1262 and 1263. The assignment node 1251 is linked to member node 1252, which has as its left child a link to the alphanumeric identifier SQL1 1254 and as its right child a link to member node 1253. Member node 1253 is linked to the operation node 1255 (rdmPROJ) as its left child. The operation node 1255 identifies the operation to be performed (in this case, a projection). The operation node 1255 is linked to member node 1256, which has as its left child a link to operation node 1258 (in this case, a restrict operation rdmREST) and as its right child a link to another member node 1257. Member node 1257 has as its left child a link to data set C2 1259. The operation node 1258 is linked to member node 1260, which has as its left child a link to the data set A 1262 and as its right child a link to another member node 1261. Member node 1261 is linked to data set D 1263. In example embodiments, these XSN trees may be internally stored in the system as an array.

Storage Manager 420 maintains the actual data that comprises each set and provides for the efficient transfer between persistent and volatile storage.

Figure 13A:
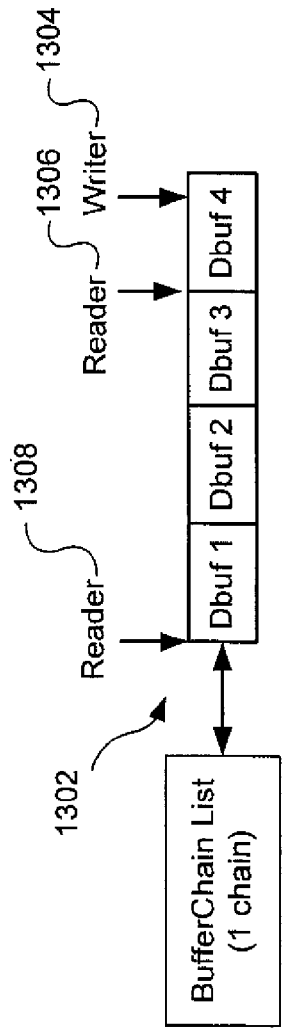
FIGS. 13A, 13B, 13C and 13D are block diagrams illustrating an example implementation of buffer chaining that may be used in example embodiments of the storage manager.

FIGS. 13A, B, C and D illustrate how buffer chaining may be used in the Storage Manager 420 to allow for pipelined transfer of data, as well as the sharing of data through these buffer chains. Note that this is only an example embodiment and there are a variety of ways in which the Storage Manager 420 could be implemented, with or without buffer chaining. Storage Manager 420 provides access to the set data via a simple mechanism in the form of SetReader and SetWriter (called Reader and Writer for short) classes, which are separate subclasses of a class called SetBase. Readers read data from storage and Writers write data to storage, and together they encapsulate the more complex functionality of the Storage Manager 420.

This encapsulation allows for a flexible Storage Manager 420 implementation that may be different for different platforms or storage systems. In addition, it allows the underlying Storage Manager 420 to provide pipelining between operations to minimize the amount of data that must be transferred from physical storage. Pipelining, in this sense, is the sharing of underlying data buffers, whether the data is being written or read. As an example, consider Operation A (OpA) and Operation B (Op B), where OpA produces (and thus stores) data, and OpB needs to read that data. A non-pipelined approach would be for OpA to simply write the data, and for OpB to read that data from storage in a separate action. Instead the Storage Manager 420 design allows OpA to write the data, and OpB to get access to the data as it is being produced, and in fact in many cases even before it is actually written to storage. Since OpB only knows the SetReader interface, it does not need to know that the data actually resulted from the output of OpA rather than from storage. As a second example, consider OpC and OpD, both of which need to read data from the same set. The pipelined Storage Manager 420 will read the data only once, for both operations.

This mechanism is illustrated in FIGS. 13 A, B, C and D. Data Sets are either generated by operations of the Set Processor or retrieved from disk via the Storage Manager. In either case, a Writer is used to place the data serially into a linked-list of RAM buffers known as a BufferChain. As operations of the Set Processor require data from the Data Sets, a Reader is used to serially retrieve the data from the linked-list of RAM buffers for use by the operations. In one example embodiment, a Data Set may have only one Writer but any number of Readers. This is illustrated in FIG. 13A, which shows a BufferChain 1302 containing four serial buffers, Dbuf 1, 2, 3 and 4. A Writer 1304 is used to point to a buffer to write data into the BufferChain 1302. The Writer 1304 proceeds serially through the BufferChain and new buffers are created as additional data is appended to the BufferChain by the Writer. Readers 1306 and 1308 are used to point to the buffers so data can be read from the BufferChain 1302.

Figure 13B:
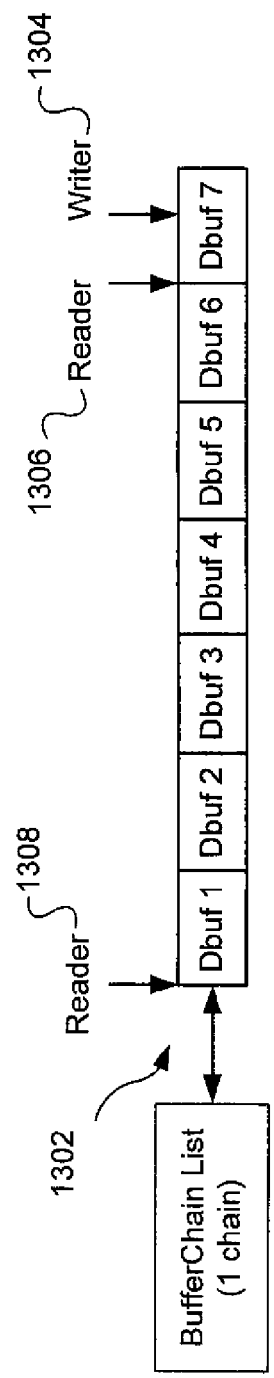

Due to the nature of operations within the Set Processor, it is likely that a Data Set being read by more than one Reader will have Readers proceeding at a different pace through the data. For instance, as shown in FIG. 13A, a slow Reader 1308 is reading Dbuf 1 while another Reader 1306 has already completed reading Dbuf 3. As the Writer and Readers proceed through the BufferChain, the Writer creates additional buffers and the Readers are free to proceed through the data at whatever pace the operations in the Set Processor require. FIG. 13B illustrates the same combination of Readers and Writer as shown in FIG. 13A, however the Writer 1304 has advanced to Dbuf 7, Reader 1306 has advanced to Dbuf 6 and the slow Reader 1308 remains on Dbuf 1.

Figure 13C:
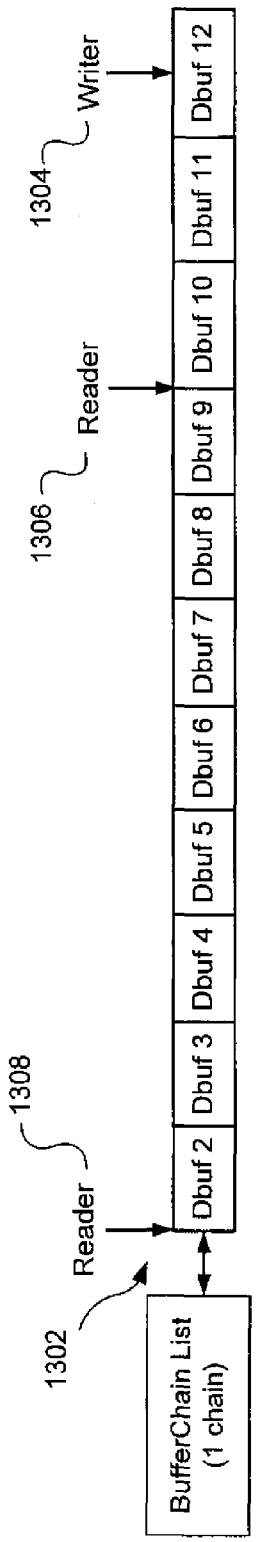
Figure 13D:
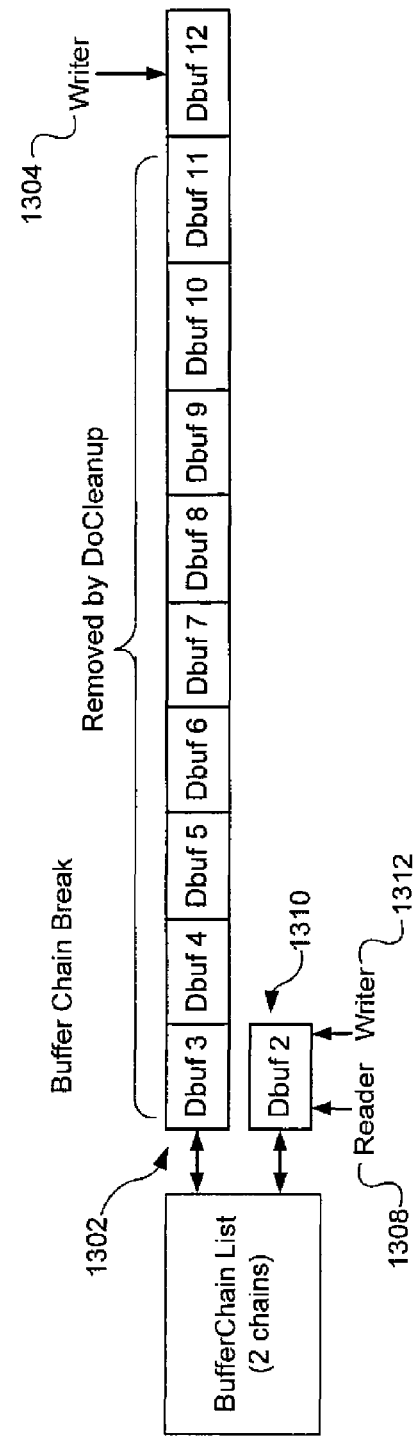

As the operations of the Set Processor continue, it is possible that a long series of buffers can be created between the slow Reader 1308 and the Writer 1304 and Readers 1306 ahead of it as illustrated in FIG. 13C. As the BufferChain 1302 grows, more and more free RAM is consumed to maintain the data in memory. At some point, the amount of RAM in use becomes excessive due to the needs of other routines that require additional RAM and some of the RAM must be released to allow its use by these other routines. When this situation is detected, a buffer chain break is initiated.

A buffer chain break is accomplished by creating an additional BufferChain associated with the Data Set. In the example shown in FIG. 13D, the slow Reader 1308 which has now advanced to Dbuf 2, is copied to a new BufferChain 1310. This new BufferChain 1310 will also be assigned a new Writer 1312 to provide the serial data from the disk. The existing BufferChain 1302, which now contains Dbuf 3 through 12, only contains the Writer 1304. As there are no more Readers behind the Writer 1304, Dbuf 3 through Dbuf 11 will be removed by the DoCleanup routine, a separate asynchronous routine that frees RAM buffers that are no longer in use by the Storage Manager. As the number of buffers can be significantly large, this provides a substantial amount of RAM that can be used by other routines that require additional RAM.

In addition to providing optimized data storage and retrieval, example embodiments can be used to translate and map requests and statements between different schema using different data models. For example, the system may include mappings between schema using different data models, such as an SQL data model, XML data model, XSN data model or other data model. Statements may be provided based on schema using the different data models. For instance, a number of query language statements based on a first schema may be provided in a first format, such as SQL format. As described above, these statements may be converted into XSN format and data sets and algebraic relations from these statements may be composed and stored in the Set Manager 402. Later, a statement may be received in a second format, such as XQuery format. This may also be converted to XSN format and data sets and algebraic relations from this statement may be composed and stored in the Set Manager 402. In particular, this statement may request a data set to be provided based on a schema using the second data model. Because all of the statements are converted into a unified XSN data model, the data sets and algebraic relations composed from the statements received in the first format may be used by the Optimizer 418 to determine an optimized collection of algebraic relations for calculating the data set requested in the second format. The algebraic relations stored in the Algebraic Cache and the mappings between the schema allow data sets and relations captured from statements in a first format to be used to optimize and calculate a data set requested in the second format. This allows multiple different data models to be supported in a single system. The system can translate between one model and another, because all of the information from the statements is captured by Set Manager as data sets and algebraic relations. Moreover, this information can be used to optimize algebraic relations being used to calculate data sets for the other data model, including substitution of subexpressions and other optimization techniques used by the Optimizer as described above. The data models may be relational data models, markup language data models, set notation data models or other data models. The formats of the statements submitted to the system may include standard query language statements, XQuery statements, set notation statements or other formats.

Figure 14A:
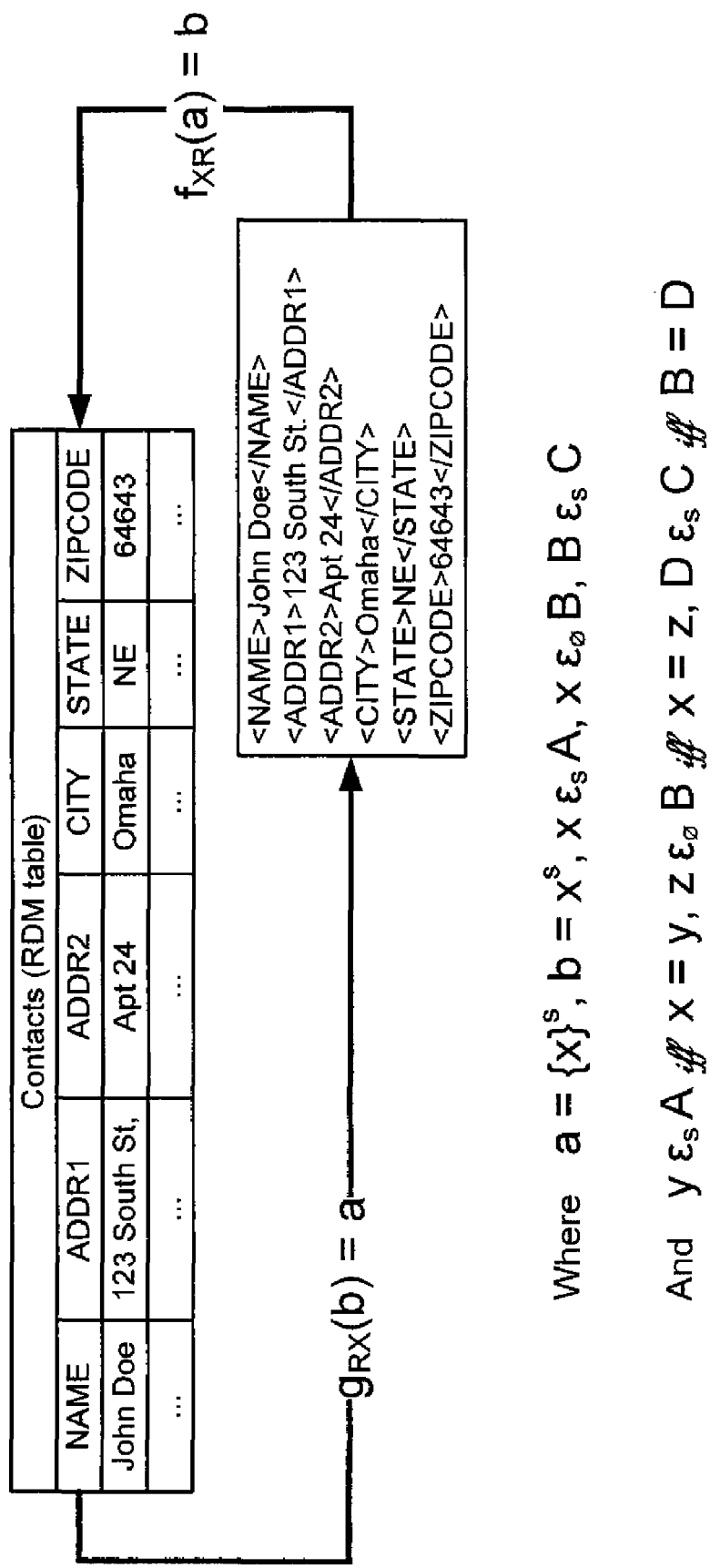
FIG. 14A is a block diagram of a relational data to XML transformation in accordance with an example embodiment.

By way of example, consider the relational table and XML document presented in FIG. 14A. The relational table can be represented mathematically as an extended set. Members of the extended set representing the relational table are commonly referred to as rows within the relational table. The rows within the relational table can also be mathematically represented as extended sets. Members of the extended set representing the rows within the relational table are commonly referred to as fields. Fields common to the rows are referred to as columns. Thus, a relational table can be represented by an extended set of the form $<<f_{11}, f_{12}, f_{13}, \ldots, f_{1c}>>, \ldots, <f_{r1},$ $f_{r2}, f_{r3}, \ldots, f_{rc}$>> where f represents the value of the field and the subscripts r and c represent an enumeration of the unique row and column.

The XML document can also be mathematically represented as an extended set. Members of the extended set representing the XML document are commonly referred to as XML fragments, containing a tag and a value to represent the data. The values of these XML fragments may be a character string or another XML fragment. Thus, an XML document can be represented by an extended set of the form <$t_1.\{v_1\}, \ldots, t_n.\{v_n\}$> where t represents the tag and v represents the value of the XML fragment.

Using the properly defined extended set transformation function $g_{RX}(\ )$ members of the extended set representing the relational table can be mapped to members of the extended set representing the XML document, allowing for the transparent representation of data in either relational or XML format. The transformation function, which provides the structural relationship between fields in the relational table and the fragments in the XML document, operates on the extended set representation of the relational table. The result of this transformation is to provide a functional mapping between the value and structure of the relational representation and the value and structure of the XML representation of the same data.

The transformation function can be stored within the Algebraic Cache as a collection of relations between a relational table and a collection of XML fragments. To map from an XML document to a relational table, the compliment of function $f_{XR}(\ )$, denoted as $g_{RX}(\ )$ in FIG. 14A is used. For these functions to provide the appropriate mappings, constraints on the terms and relationships of the terms must be valid. These constraints are listed in FIG. 14A as the where clause. The constraints that a must equal s.$\{x\}$ along with the membership constraints of x and z in B, and B and D in C, indicate that the XML fragment must contain one value and only one value. Further, the constraint that b must equal s.x along with the membership constraints of x and y in A indicates that the relational field in a particular row must have one and only one value. Combined, these constraints ensure the unique mapping from the XML fragment to a field in the relational table.

Figure 14B:
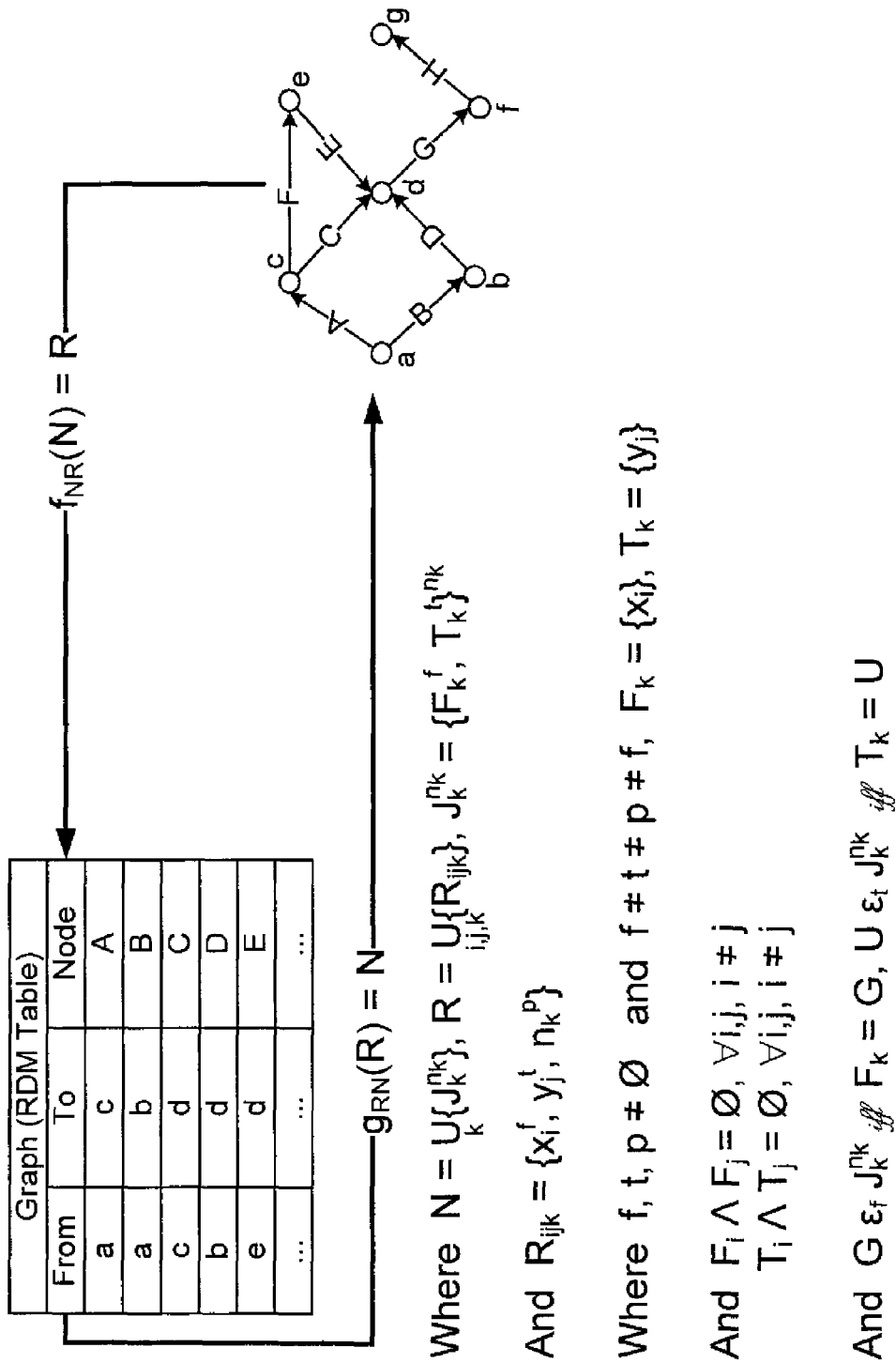
FIG. 14B is a block diagram of a relational data to directed graph transform in accordance with an example embodiment.

Another example would be the mapping of the vector representation of a directed graph to a relational data table. The directed graph illustrated in FIG. 14B is comprised of paths and junctions. At each junction, one or more paths lead to and away from the junction, with the exception of the start of the directed graph, which only has paths leading away, and the end of the directed graph, which only has paths leading to. Each junction of the directed graph and the paths leading to and from it can be expressed as an extended set of the form $\{\text{from}.\{p_1p_2, \ldots, p_m\}, \text{to}.\{p_{m+1}, p_{m+2}, \ldots, p_n\}\}$ where the values $p_1$ through $p_m$ uniquely identify paths from the junction and values $p_{m+1}$ through $p_n$ uniquely identify paths to the junction. Thus, the directed graph may be represented by the extended set $\{j_1.\{\text{from}.\{p_{11}, p_{12}, \ldots, p_{1m}\}\text{to}.\{p_{1m+1}, p_{1m+2}, \ldots, p_{1n}\}\}.j_2.\text{from}.\{p_{21}, p_{22}, \ldots, p_{2m}\}, \text{to}.\{p_{2m+1}, p_{2m+2}, \ldots, p_{2n}\}\}, \ldots, j_k.\{\text{from}.\{p_{k1}, p_{k2}, \ldots, p_{km}\}, \text{to}.\{p_{km+1}, p_{km+2}, \ldots, p_{kn}\}\}$. In this case, the transformation function is $f_{NR}(\ )$. The transformation function which fully maps the directed graph to the relational table is explicitly defined as presented in FIG. 14B. As in the case of the relational to XML mapping, constraints are required to enforce the rules of each model, as well as provide for the mapping of values and structures between models. The directed graph is fully represented by the extended set N. The extended set N is the union of the terms $n_k.J_k$, which represent the paths, for all k junctions of the graph. The paths $n_k.J_k$ are defined in terms of the from paths f.$F_k$ and the to paths t.$T_k$ each junction. The relational table is represented by the extended set R. The extended set R is the union of the terms $R_{ijk}$, which represent each row of the relational table containing the fields from, to and path. The remaining constraints define the relationships between the terms and limits on the terms themselves. This includes the constraint that f, t, and p must exist and cannot be equal to each other, that $F_k$ must equal $\{x_i\}$ and $T_k$ must equal $\{y_j\}$ to define the relationship between the relational table fields and the directed graphic paths, that the pairs of $F_k$ and $T_k$ representing a path must be unique, and that there is one unique value of scope f and of scope t for each path represented by $J_k$.

It will be understood that the above formats, schemas and mappings are examples only and that other formats, schemas and mappings may be used in the other embodiments.

Example Extended Set Notation

As described above, Extended Set Notation (XSN) may be used in example embodiments. The following describes one example of an Extended Set Notation (XSN) that may be used. This is only one possible embodiment of Extended Set Notation and other embodiments may use different terminology, types of sets, syntax, parameters, operations and functions than those below. The example of the Extended Set Notation provides a straightforward, easy to use syntax to specify and manipulate expressions based on extended set mathematics within the environment of a modem computing system. This notation, expressible in standard ASCII characters, provides a standard syntax to represent values, sets, operations, relations and expressions in a manner suitable for computer-based manipulation and processing. This notation provides the capability for standard ASCII characters to specify algebraic extended set expressions in a machine readable form.

The terminology used to describe and identify the major components of XSN is defined in Table 1 below.

TABLE 1

| | |
|---|---|
| Values | A Value represents a unique scalar quantity in a specific number system domain. Values can be specified explicitly by using a collection of symbols representing a specific, unique value or implicitly by an Alphanumeric Identifier. |
| Alphanumeric Identifiers | Alphanumeric Identifiers represent implied Values or Sets and can be specified by the digits 0 through 9, the lower-case alphabetic characters a through z, and the upper-case alphabetic characters A through Z in any string combination. |
| Scopes and Constituents | Scopes and Constituents are the two distinct parts of elements or members representing the two conditions of membership required for extended sets. Scopes and Constituents can be represented by Values, Alphanumeric Identifiers, Elements or Sets. |
| Elements | Elements are Scopes or Constituents that have a compound structure requiring at least one Scope and one Constituent. A Constituent must be stated explicitly; however a Value of NULL is implied for Scopes |

TABLE 1-continued

| | |
|---|---|
| | not explicitly stated. |
| Members | Members are an Element specified within the context of a Set. |
| Sets | Sets are collections of members. Sets include the Empty Set—a Set with no members. Sets, like Values, can be explicitly specified by enumerating the membership or implicitly specified via an Alphanumeric Identifier. |
| Functions and Operations | Functions and Operations are specified explicitly and define a Set specified by the Function or Operation in combination with one to three Sets providing the arguments to that Function or Operation. Operations are atomic and specified in the extended set mathematics. Functions are combinations of one or more Operations and are a notational convenience for frequently performed combinations of Operations. |
| Expressions | Expressions are a symbolic means for specifying a Set. An Alphanumeric Identifier representing a Set is the simplest form of an Expression. Expressions can also be comprised of many Functions, Operations and Sets expressing a Set. |
| Relational Operators | Relational Operators are a symbolic means for specifying a relationship between two Expressions. Relational Operators include equal, subset and disjoint, as well as their negations. |
| Assignments | Assignments are Statements that assign Alphanumeric Identifiers to Expressions. |
| Relations | Relations are Statements relating two expressions by a Relational Operator. |
| Statements | Statements are Assignments or Relations. |

Syntax. The XSN syntax comprises a symbolic means for specifying sets as well as the grammar for formulating expressions and statements. In the description below, terms enclosed in brackets ([ ]) indicate optional syntax. For example, in the case where the scope is not required, an element is expressed as [scope].constituent. Ellipses ( . . . ) denote repetition of a sequence of arbitrary length. For Example, <"1","2","3", . . . >

Symbols. The syntax employs common punctuation symbols as set forth in Table 2 below. Optional spaces can be inserted between punctuation where desired to aid in readability. Line breaks may occur anywhere within a statement, expression, or set for clarity.

TABLE 2

| Description | Symbol | Usage | Example |
|---|---|---|---|
| Double Quotes | " | Double Quotes delimit explicit values. | "Curly","Moe" |
| Periods | . | Periods are used to separate scopes from constituents within the same element. | "Curly"."Moe" |
| Commas | , | Commas are used to separate members in an explicitly defined set. | {"Curly","Moe","Larry"} |
| Curly Braces | { } | Curly Braces enclose members of an explicit set. | {"Curly","Moe","Larry"} |
| Angle Braces | < > | Angle Braces enclose members of an explicit ordered set. | <"Curly","Moe","Larry"> |
| Parentheses | ( ) | Parentheses enclose combinations of scopes, constituents and expressions when specifying an element to distinguish scopes from constituents separated by Periods. Parenthesis are also used in the specification of operations and functions. | ("Curly"."Moe")."Larry" CRD(SETA) |
| Equals | = | The equal sign assigns alphanumeric identifiers to sets. | Name={"Curly","Moe","Larry"} |

Values. Values are specified by explicitly stating the value within double quotes. Examples of values include "Curly", "123", and "$2,343.76". If the value includes the double quote character ("), it can be delimited by inserting a double quote in advance of it. For example, "John said ""shoot"" when he saw the moose." A null value is specified by two successive double quotes, such as " ".

Alphanumeric Identifiers. Sets to be identified by alphanumeric identifiers are specified by assignment statements. Once specified, the alphanumeric identifier can be used interchangeably with the expression to which it is assigned. For example, if a set is assigned the alphanumeric identifier NDCENSUS1960, then NDCENSUS1960 can be used in any expression to reference the set to which NDCENSUS1960 is assigned.

Scopes, Constituents and Elements. Scopes and constituents can be represented by values, alphanumeric identifiers, elements or sets. The syntax for an element is [scope.]constituent. Scopes are separated from constituents through the use of a period, with the term to the left of the period representing the scope and the term to the right of the period representing the constituent. For example, an element where the scope has a value of "1" and the constituent has the value of "Bob" would be expressed as "1"."Bob" in proper notation.

Elements are scopes or constituents that have a compound structure requiring at least one scope and one constituent. A constituent must be stated explicitly; however a value of NULL is implied for scopes not explicitly stated. In the example above, the element "1"."Bob" has a scope of "1" and a constituent of "Bob". However, both scopes and constituents can also be alphanumeric identifiers, elements and sets, resulting in potentially complex expressions.

One issue arising from these potentially complex expressions is precedence regarding scope and constituent. For example, given the element "integer"."sum"."5" a question of delimiting the scope and constituent arises: is the scope "integer" or "integer"."sum"? Is the constituent "5" or "sum"."5"? By convention in this example XSN, the term to the left of the first period is the scope, and the term to the right is the constituent. This would then infer that "integer" is the scope and "sum"."5" is the constituent. However, if it is desired that "integer"."sum" be the scope and "5" be the constituent, this can be specified through the use of parentheses, as in the element ("integer"."sum")."5".

Members and Sets. Members are elements, sets or expressions contained within sets. Sets are specified by expressions or by enumerating their individual members, some or all of which can be elements, sets or expressions. Any set containing the same members enumerated in any sequence is the same set.

In many cases, the members of a set contain scopes that belong to the set of natural numbers. In some cases these scopes are contiguous, unique and include the value one. In these cases, the sets can be referred to as ordered sets. All sets that do not meet these criteria can be referred to as unordered sets.

Sets are expressed as {member[,member[, . . . ]]}. The members of an unordered set are enclosed in curly braces, as in {"a","x","b","g"} or {"Groucho","Harpo","Gummo"}. The members of an ordered set are enclosed in angle braces, as in <"a","b","x","g">. The members of an ordered set have the implicit order in which they are listed in its specification. The scope of each successive member of an ordered set is the corresponding member of the set of natural numbers. Thus, <"a","b","x","g"> is equivalent to {"1"."a","2"."b","3"."x", "4"."g"}.

For example, an ordered set can represent a data record with any number of data fields, in which the members of the set represent the fields of the record and the scopes of the members are the ordinal positions of the corresponding fields in the record. The comma-separated values in the first row of the table below can be specified as a set for processing. The data can be grouped into hierarchies in many different ways. Table 3 below illustrates several possibilities.

The original comma-separated values comprise four sequences of values, each with three values.

Set 1 is specified as an unordered set of four members, each of which contains an unordered set of three members.

Set 2 is specified as an ordered set of four members, each of which contains an unordered set of three members.

Set 3 is specified as an unordered set of four members, each of which contains an ordered set of three members.

Set 4 is specified as unordered. It uses scopes to indicate the positioning of each member of the set relative to the other members of the set.

The content and structure of sets is sometimes dictated by their purpose, particularly when the sets are used as arguments in functions and operations. Several of these dictated structures occur frequently when using the example XSN to describe relational data operations. Some of these common sets are typically called predicate, mapping, transformation, or aggregation sets and are explored in more detail below.

Predicate Sets. Predicate sets provide for mapping specification between the members of one set and another. Predicate sets describe a nested conditional expression to determine truth. In the case of conditional expressions, like those used in the RDMREST function, the basic condition is expressed: "condition".<element1, element 2>

An element may be specified as "column value" or as "const"."scalar value". The condition is specified as equal ("EQ"), not-equal ("NEQ"), less-than ("LT"), less-than-or-equal ("LE"), greater-than ("GT"), greater-than-or-equal ("GE"), like ("LK") or not like ("NLK"). In the case of the RDMREST function, each element will specify a column to be compared on the conditional or a constant scalar value designated by the scope "const".

For example, the condition phrase "EQ".<"2","const"."MI"> in which the condition is EQ, the first element names the column and the second element provides a constant value, indicates that all members (rows) with the second column equal to the value of "MI" will be included in the output set.

In the example below, a single conditional is specified for the Predicate Set of the RDMREST function. The resulting set will contain only the members (rows) from set zipcitystate that contain the value "IN" in the third column. Note the two additional sets of braces.

RDMREST(zipcitystate, {{{"EQ".<"3","const"."IN">}}})

These are necessary to support the construction of AND and OR conditionals, covered below.

AND Statement. A set of conditions is an AND statement; all conditions in the list are ANDed together. If they are all true, the overall conditional is true. Here is an example of an AND structure:

TABLE 3

| Sets | Members |
|---|---|
| Original comma-separated values | "A", "B", "C"<br>"D", "B", "E"<br>"F", "G", "C"<br>"H", "K", "C" |
| Set 1 | {{"A","B","C"},{"D","B","E"},{"F","G","C"},{"H","K","C"}} |
| Set 2 | <{"A","B","C"},{"D","B","E"},{"F","G","C"},{"H","K","C"}> |
| Set 3 | {<"A","B","C">,<"D","B","E">,<"F","G","C">,<"H","K","C">} |
| Set 4 | {"1".{"1"."A","2"."B","3"."C"},"2".{"1"."D","2"."B","3"."E"},<br>"3".{"1"."F","2"."G","3"."C"},"4".{"1"."H","2"."K","3"."C"}} |

{{"EQ".<"2","const"."MI">},{"GE".<"5","const"."49000">},{"LT".<"5","const"."51000">}}

The three condition phrases are enclosed in a set of curly braces to delimit the AND statement.

OR Statement. An OR statement is created by combining two or more AND statements. If the result of any AND statement is true the entire statement is true. Here is an example:

{{{"GE".<"1","const"."10000">}},{{"GT".<"3","const"."AK">},{"LT".<"3","const"."CA">}},{{"EQ".<"2","const"."Pasadena">}}})

In this example, there are three OR statements. The first contains one condition phrase, the second contains two AND'ed condition phrases, and the last contains a single condition phrase. In this manner, complex conditional expressions can be built up to define the operation.

Manning Sets. For some operations and functions, sets are required to provide mappings. In most cases, the scope and constituent are used to provide a relationship between the input and output sets. For example in the RDMPROJ operation, a set provides the mapping between the columns of the input set and the columns of the output set. The scope value indicates the column of the output set, the constituent the column of the input set. For example:

>"3","5","1"›

This Predicate set indicates that the third, fifth and first columns of the input set should be mapped to the first, second and third columns of the output set.

Transformation Sets. Transformation expressions are used to transform one or more input values from a set into a value in the output set. Transformations include operations such as subtraction ("SUB"), addition ("ADD"), division ("DIV") and multiplication ("MUL"). An additional transformation operation is constant ("CONST"). Transformation expressions are typically used with relational operations, such as RDMMATH, to define the members of the output set. For example, if the first column of an output set were designated as the sum of the first and second column of the input set, the following transformation set would be used to specify this:

<"ADD".<"1","2">>

This indicates that the first and second columns of the input set should be used as the first and second arguments of the addition transformation to produce the value for the first column of the output. Transformations can be deeply nested to provide specifications, for example if the calculation (COL1+COL 2)/(COLS3−1) were desired to represent column one in the output set, and columns five and six of the input set were to map to columns two and three, the transformation set would be:

<"DIV".<"ADD".<"1","2">, "SUB".<"3","CONST"."1">>,"5","6">

Transformation sets can also include specific scalar domain qualifiers. For example, if the math is to take place in the integer domain, the example of <"ADD".<"1","2">> would be expressed as:

<("int64"."ADD").<"1","2">>

This would indicate that the scalar values of columns 1 and 2 would be added together as if they were integer values. The result would also be produced in the integer scalar domain. Like function and operation names, the scalar domain identifiers are not case sensitive.

Aggregation Sets. Sets are also be used in the RDM-GROUP function to provide aggregation. The aggregation operations include summation ("SUM"), average ("AVG"), count ("CNT"), minimum ("MIN") and maximum ("MAX"). These functions specify the operations to be performed on the members of the set in each group created by the RDM-GROUP function. For example:

<"1","3","COUNT"."1","AVG"."1">

This would indicate that the first and third column of the input provide the basis of the group and be included as the first and second column of the output. The third column of the output would be the count of members from column one in the group, and the fourth would be the average of the members in column one of the group.

Like the transformation sets, the aggregate sets can specify the scalar domain in which the operations are to be performed. For example, if the above were to be performed in the string domain, the set specified would be:

<"1","3",("STRING"."COUNT")."1",("STRING"."AVG")."1">

Functions and Operations. Functions and operations are specified explicitly and define a set specified by the function or operation in combination with one to three sets providing the arguments to that function or operation. Other embodiments may permit a different number of arguments. Operations are atomic and specified in the extended set mathematics. Functions are combinations of one or more operations and are a notational convenience for frequently performed combinations of operations.

Functions and operations are expressed via a predefined alphanumeric identifier, parenthesis and between one to three set arguments. An example would be CRD({"1","2","3"}) which represents the set that is the cardinality set of {"1","2","3"}.

Generally, functions are specified:

function(expression1[,expression2[, expression3[, . . . ]]]), where the number of arguments is dependent on the function. Specifically, a unary function requires one argument a binary function requires two arguments, and a ternary function requires three arguments. In some functions, the final argument is a set used to specify mappings and transformations. Unlike alphanumeric identifiers used for sets, function and operation names are not case sensitive.

The following are some examples of functions:

RDMPROJ(ASet,<"7","1","2","3">)—RDMPROJ is the Relational Data Model (RDM) projection function. The set named ASet is the argument to the operation representing the relational table. The second set is a set specifying the mapping of the members (columns) from ASet to be used as the columns in the resulting set.

INV(OldSet)—INV is the inversion function, resulting in the exchange of scopes and constituents for the members of the set. The set named OldSet is the argument for the operation; it is inverted to produce the output.

CRD(MySet)—CRD is the cardinality function, resulting in the cardinality set for the input argument set. The set named MySet is the input, used to produce the output set.

RDMJOIN(cities_and_states,states_and_zips, {{{"EQ".<"2","3">)}}})—RDMJOIN is the Relational Data Model (RDM) join function. The first two sets named cities_and_states and states_and_zips are to be joined by the operation. The explicit Predicate set provided for the third set specifies the condition used to select members for the joined resulting set. In this case, the Predicate set specifies that if the second column of the first set is equal to the first column of the second set (the states columns), the rows should be joined in the output set.

RDMREST(zips,{{{"GE".<"1","const"."10000">}, {"LE".<"1","const"."14999">}},{{"GT".<"3","cons- t"."AK">},{"LT".<"3","const"."CA">}}})—RDMREST is the Relational Data Model (RDM) restrict function. The first set named zips is the argument for the operation representing the relational table. The second argument is the Predicate set that specifies which members (rows) shall be included in the restricted output set.

In this example, functions with names beginning with RDM (Relational Data Model) are specifically designed for manipulating relational data as sets. For example, RDM-SORT is a binary function that sorts the set of the first argument using the members in the set of the second argument that indicate sort order and precedence.

Expressions. Expressions are a symbolic means for specifying a set. An alphanumeric identifier representing a set is the simplest form of an expression. Expressions can also be comprised of many functions, operations and sets. Some examples of expressions include:

```
CRD(SetA)
rdmPROJ(SetA, <"1","5","23">)
CRD(rdmPROJ(SetA, <"1","5","23">))
```

Relations and Relational Operators. Relational operators are a symbolic means for specifying a relationship between two expressions. Relational operators include equal, subset and disjoint, as well as their negations. These are specified with the values "EQ", "SUB", "DIS" and "NEQ", "NSB", and "NDS", some example statements using relational operators include:

SetA EQ CRD(SetB)

SetC SUB SetB

Assignments. Assignments are statements that assign alphanumeric identifiers to expressions. Syntactically, assignments are specified as: alphanumeric identifier=expression. For example:

```
NewSet=<"1","2","12","4">
SetA=SS(SETB)
SetC=<"b","c","a","x">
SetD={"Larry","Moe","Curly"}
SetG=NULL
```

Relational Data Model. The relational data model (RDM) is a subset of the extended set data model that can be described with XSN. Relational tables are considered to be sets of ordered sets, with the rows of the table being represented by these ordered sets. The members of the sets representing the rows are the values of the columns (fields) within the rows. A relational table with three rows, with each row containing four columns, would be represented by a set with the structure:

<<a1,b1,c1,d1>,<a2,b2,c2,d2>,<a3,b3,c3,d3>>

Both the table and the individual rows are represented as ordered sets, but it is also possible to express the relational table as a set containing members that are unordered, such as:

{<a1,b1,c1,d1>,<a2,b2,c2,d2>,<a3,b3,c3,d3>>}

Cardinality Sets. In the case where the set is presented as ordered, information must be present to indicate the ordering of the set. To preserve some of the additional characteristics of the relational data model and to provide cardinality information useful to optimize processing of XSN expression, cardinality sets are typically specified for sets representing relational tables. The cardinality set for the unordered set above is:

<"3","4",<Ca,Cb,Cc,Cd>>>

The cardinality set is a nested set. The outermost set contains the cardinality of the set (which in this example is 3 as the table contains three rows), followed by the cardinality set for the members representing the rows. Ca through Cd are values representing the cardinality of the values making up the members of the sets representing the rows. Each value of $C_n$ represents the maximum cardinality for that particular member. The cardinality set is generated via the cardinality function:

CardinalityOfSetA=CRD(SetA)

RDM Functions. The standard relational data model is composed of eight operations. However, it can be shown that only five are required to implement the entire relational model, and only four are typically used for practical implementations. XSN provides for notation of these functions within the framework of extended set mathematics.

These functions are extended set versions of the relational data model UNION (RDMUNION), PROJECT (RDM-PROJ), RESTRICT (RDMREST), JOIN (RDMJOIN), DIF-FERRENCE (RDMDIFF) and DIVIDE (RDMDIV). In addition to these functions, three additional functions are available under XSN. These include RDMSORT, RDMPIVOT and RDMGROUP.

RDMDIFF Function. RDMDIFF defines an unordered set equivalent to the relational A–B operation. The resulting set contains all members of A that are not in B. The following is an example format and description of this function:

RDMDIFF(A, B)={ }

Arguments:

A—an unordered set.

B—an unordered set whose members will be excluded from A to produce the result.

Result: A unordered set containing those members of A that are not members of B as specified by the conditional of the difference function.

Remarks: As an extension to the standard relational difference, which requires that all values of the column members be equivalent, the XSN version allows for the specification of a Predicate set to define the equivalence relationship. If NUL is provided for the conditional Predicate set, the standard RDM function is performed. If A EQ B, then the NUL set results. If the intersection of A and B is the NUL set, then A results.

Requirements: Set A must be an RDM set. Results when these conditions are not met are the NUL set. A and B must have the same member column cardinality.

Example:

```
A = {<"a", "b", "c">, <"d","b","r">}
B = {<"3","c","8">}
RDMDIFF(A,B) == {<"a","b","c">}
```

RDMGROUP Function: RDMGROUP defines an unordered set where columns are aggregated based on specified groupings identified by the members of one or more columns. In conjunction with an aggregate Predicate set, this function provides for the ability to generate sum, count, average, minimum and maximum (SCAMM) values. The following is an example format and description of this function.

RDMGROUP(A, Z)

Arguments: A—an ordered or unordered set.

Result: An unordered set containing members that have been generated based on aggregate functions of the members of the columns of set A and the specified aggregation Predicate set Z.

Remarks: RDMGROUP will produce one member row for each unique combination of the value of member columns as specified in the Predicate set. Member columns to aggregate on are specified by enumerating them in the Predicate set without scope. Other members to be included in the output set should indicate which aggregate SCAMM values should be executed to produce the output set.

Requirements: Set A must be an RDM set. Set Z must be an aggregate Predicate set. Results when these conditions are not met are the NUL set.

Example:

```
A = <<"3","Tom","a">,
     <"2","Sam","c">,
     <"6","Harry","a">,
     <"7","Harry","a">>
Z = <"3",
     "COUNT"."2",
     "SUM"."1">
RDMGROUP (A,Z) -> {<"a","3","16">, <"c","1","2">}
```

RDMJOIN Function. RDMJOIN defines an unordered set whose member rows are the concatenation of one member row from set A and one member row from set B when determined by the satisfaction of the conditional Predicate set Z between the two member rows. The following is an example format and description of this function:

RDMJOIN(A,B,Z)={ }

Arguments:

A—an unordered set to be joined as the left side of the resulting member row.

B—an unordered set to be joined as the right side of the resulting member row.

Z—a Predicate set containing the conditional set for determining the members to join.

Result: An unordered set whose members are created from one member row from A and one member row from B matching the conditions specified in the conditional Predicate set Z. When a member row from set A and a member row from set B are found which satisfy the condition specified in the Predicate set Z, a member of the resultant set is produced. The resulting member row is an ordered member containing the member columns of the member row from set A, followed by the member columns from the member row of set B.

Remarks: The conditional Predicate set Z specifies the conditions that must hold between a member row of set A and a member row of set B.

Requirements: Sets A and B must be an RDM sets. Set Z must be a conditional Predicate set. Results when these conditions are not met are the NUL set. The Predicate set Z must have the schema defined for conditionals. The scope of the members in the Predicate set specify the member column of set A; the constituent of the members in the Predicate set specify the member column from set B.

Example:

```
A = {<"sales", "Tom">,
     <"sales", "Sam">,
     <"shipping", "Bill">,
     <"shipping", "Sally">}
B = {<"Bldg 1", "sales">,
     <"Bldg 2", "shipping">}
Z = {{{"EQ".<"1","2">}}}
RDMJOIN(A, B, Z) -> {
     <"sales", "Tom", "Bldg 1", "sales">,
     <"sales", "Sam", "Bldg 1", "sales">,
     <"shipping", "Bill", "Bldg 2", "shipping">,
     <"shipping", "Sally", "Bldg 2", "shipping"> }
```

RDMPIVOT Function. RDMPIVOT defines an ordered set which exchanges the member columns and member rows of the specified set. The following is an example format and description of this function:

RDMPIVOT(A)==< >

Arguments:

A—an ordered set.

Result: The resulting set contains member rows comprised of the member columns of set A. The set is ordered by the order of the member columns in set A.

Remarks: Pivoting extremely large sets can be costly and time consuming and should only be done if no other means of processing the sets can be found.

Requirements: Set A must be an RDM set. Results when these conditions are not met are the NIL set.

Example:

```
A = {<"3", "Tom", "a">,
     <"2", "Sam", "c">,
     <"6", "Harry", "a">,
     <"7", "Harry", "a">}
RDMPIVOT(A) -> <
     <"3", "2", "6", "7">,
     <"Tom", "Sam", "Harry", "Harry">,
     <"a", "c", "a", "a">>
```

RDMPROJ Function. RDMPROJ defines an unordered set comprised of members from all member rows of the argument set, but member column values specified through a transformation Predicate set. The following is an example format and description of this function:

RDMPROJ(A,Z)={ }

Arguments:

A—an unordered set to be projected.

Z—a transformation Predicate set for the projection.

Result: The resulting set contains a member row for each member row of the A, but with the member columns specified by the transformation Predicate set.

Remarks: See specification for the transformation Predicate set for information on how to properly specify set Z.

Requirements: Set A must be an RDM set. Set Z must be a transformation Predicate set. Results when these conditions are not met are the NUL set.

Example:

```
A = { <"3", "Tom", "a", "b", "s">,
      <"2", "Sam", "c", "b", "s">,
      <"6", "Harry", "a", "z", "s"> }
Z = <"3","2">
RDMPROJ(A, Z) -> {<"a", "Tom">,
                  <"c", "Sam">,
                  <"a", "Harry">}
```

RDMREST Function. RDMREST defines an unordered set whose member rows are restricted to those that satisfy the conditions specified within the conditional Predicate set. The following is an example format and description of this function:

RDMREST(A,Z)={ }

Arguments:

A—an unordered set to be restricted.

Z—a conditional Predicate set specifying the conditions for restriction.

Result: The resulting set contains only those member rows from the set A that meet the conditions specified by the conditional Predicate set Z.

Remarks: See specifications for the conditional Predicate set for information on how to specify set Z.

Requirements: Set A must meet the requirements for an RDM set. Set Z must be a conditional Predicate set. If these conditions are not met, the NUL set results.

Example:

```
A = { <"3", "Tom", "a", "b", "s">,
      <"2", "Sam", "c", "f", "s">,
      <"6", "Harry", "a", "z", "s">}
Z = {{{"EQ".<"2","const"."Tom">}},
     {{"EQ".<"2","const"."Harry">},{"EQ".<"4","const"."f">}}}
RDMREST(A, Z) -> {<"3", "Tom", "a", "b", "s">}
```

RDMSORT Function. RDMSORT defines an ordered set based on an unordered set A and the ordering specified by Predicate set Z. The following is an example format and description of this function:

RDMSORT(A, Z)=< >

Arguments:

A—an unordered set.

Z—a mapping set describing the sort order of the resultant set.

Result: An ordered set containing all the member rows of set A sorted by ordering specified in mapping set Z.

Remarks: Z is a mapping set containing the scopes of the member columns specifying the most to least significant members, which determine the ascending sort order.

Requirements: The Predicate set Z must be an ordered set whose elements are members of NAT each less than the cardinality of set A. Set A must be an RDM set. If these conditions are not met, the result is the NUL set.

Example:

```
A = {<"3", "Tom", "a", "b", "s">,
     <"2", "Sam", "c", "b", "s">,
     <"6", "Harry", "a", "z", "s">}
Z = <"3","2">
```

-continued

```
RDMSORT(A, Z) -> <<"6", "Harry", "a", "z", "s">,
                  <"3", "Tom", "a", "b", "s">,
                  <"2", "Sam", "c", "b", "s">>
```

RDMUNION Function. RDMUNION defines an unordered set that contains all the member rows for sets A and B. The following is an example format and description of this function:

RDMUNION(A, B)={ }

Arguments:

A—an unordered set.

B—an unordered set.

Result: An unordered set containing the member rows of both A or B.

Remarks: None.

Requirements: A and B must be RDM sets and must have the same member column cardinality. If these conditions are not met, the NUL set is the result.

Example:

```
A = {<"a", "b", "c">}
B = {<"3", "c", "8">}
RDMUNION(A, B) -> {<"a", "b", "c">,
                   <"3","c","8">}
```

The above functions, formats and arguments are examples only and may be different in other embodiments. For example, different or additional functions may be used in other embodiments.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer system comprising:
    (a) at least one processor;
    (b) at least one memory, wherein the at least one memory includes a relation store and a data set information store; and
    (c) computer program instructions stored in the memory and configured to be executed by the processor to provide a requested data set, including:
        (i) instructions for receiving a first query language statement referencing a plurality of data sets;
        (ii) instructions for storing information in the data set information store regarding the data sets referenced in the first query language statement, including temporal information regarding the data sets referenced in the first query language statement;
        (iii) instructions for composing a first plurality of algebraic relations referencing the data sets specified in the first query language statement, wherein each of the algebraic relations in the first plurality of algebraic relations comprises a respective first expression including a symbolic representation of at least a first respective data set, a respective second expression including a symbolic representation of at least a second respective data set, and a relational operator symbolically defining a mathematical relationship between the respective first expression and the respective second expression;

(iv) instructions for storing the first plurality of algebraic relations in the relation store;

(v) instructions for receiving a second query language statement referencing a second plurality of data sets;

(vi) instructions for composing a second plurality of algebraic relations referencing the data sets specified in the second query language statement;

(vii) instructions for storing the second plurality of algebraic relations in the relation store;

(viii) instructions for providing the requested data set in response to the second query language statement using at least one algebraic relation from the first plurality of algebraic relations and at least one algebraic relation from the second plurality of algebraic relations; and (ix) instructions for removing at least some of the first plurality of algebraic relations from the relation store based, at least in part, on the temporal information regarding the data sets referenced in the first query language statement.

2. The computer system of claim 1 wherein the computer program instructions further comprise:

instructions for defining at least one new data set by composing an algebraic relation referencing at least one of the data sets specified in the second query language statement; and instructions for storing the algebraic relation for the new data set in the relation store.

3. The computer system of claim 1, wherein the data sets specified in the second query language statement include at least one explicit data set, the computer program instructions further comprising:

instructions for associating a data set identifier with the explicit data set; and instructions for storing the data set identifier in the data set information store.

4. The computer system of claim 1, further comprising a data store for storing at least some of the data sets, wherein at least one of the data sets specified in the second query language statement has not been stored in the data store at the time the second query language statement is received.

5. The computer system of claim 1, wherein the temporal information is associated with each of the data sets in the data set information store to indicate the time at which information regarding the data set is added to the data set information store.

6. The computer system of claim 1, wherein the data set information store includes a unique identifier and an external identifier associated with each data set in the data information store and wherein the external identifier is the same for at least some of the data sets.

7. The computer system of claim 5, wherein the data set information store includes a unique identifier and an external identifier associated with each data set in the data information store and wherein the external identifier is the same for at least some of the data sets.

8. The computer system of claim 5, wherein the computer program instructions further comprise instructions for temporally redefining the data set information store by removing data sets from the data set information store that are associated with temporal information prior to a specified time.

9. The computer system of claim 8, wherein the instructions for removing at least some of the first plurality of algebraic relations further comprise instructions for removing algebraic relations from the relation store that reference the data sets removed from the data set information store.

10. The computer system of claim 1, further comprising a data store for storing at least some of the data sets, wherein the data set information store includes information regarding at least one data set that is defined by an algebraic relation in the relation store and is not stored in the data store.

11. The computer system of claim 9, further comprising a data store for storing at least some of the data sets, wherein the data set information store includes information regarding at least one unrealized data set that is not stored in the data store and is defined by an algebraic relation in the relation store that references a data set having temporal information prior to the specified time, wherein the instructions for temporally redefining the data set information store further comprise instructions for storing the unrealized data set in the data store before removing the data set having temporal information prior to the specified time from the data set information store.

12. The computer system of claim 1, wherein the second plurality of algebraic relations composed from the second query language statement have a single operator and a number of operands in the range of from one to three.

13. The computer system of claim 2 wherein the algebraic relation for the new data set has a single operator and a number of operands in the range of from one to three.

14. The computer system of claim 1, wherein the second query language statement is based on a relational data model.

15. The computer system of claim 1, wherein the second query language statement is received in an structured query language (SQL) format.

16. The computer system of claim 1, wherein the second query language statement is based on a markup language model.

17. The computer system of claim 1, wherein the second query language statement is received in an XQuery format.

18. The computer system of claim 1, wherein the second query language statement requests the requested data set to be provided and the relation store includes other algebraic relations for data sets that are not composed from the second query language statement, the computer program instructions further comprising instructions for using at least some of the other algebraic relations to provide the requested data set.

19. The computer system of claim 1, wherein the second query language statement requests the requested data set to be provided and the requested data set is different from each of the data sets referenced in the first query language statement.

* * * * *

Disclaimer

8,032,509 — Christopher M. Piedmonte, Liberty Hill, TX (US). SYSTEMS AND METHODS FOR DATA STORAGE AND RETRIEVAL USING ALGEBRAIC RELATIONS COMPOSED FROM QUERY LANGUAGE STATEMENTS. Patent Dated Oct. 4, 2011. Disclaimer filed February 27, 2012 by the Assignee, Algebraix Data Corporation.

The term of this patent shall not extend beyond the expiration date of Patent No. 7,877,370.

(*Official Gazette, March 27, 2012*)